(12) United States Patent
Yim

(10) Patent No.: US 12,423,425 B2
(45) Date of Patent: Sep. 23, 2025

(54) PAVE AND/OR REPAVE SYSTEMS AND METHODS USING RANSOMWARE PROTECTION SMART NETWORK INTERFACE CONTROLLER OR RANSOMWARE PROTECTION STORAGE DEVICE SECURE SNAPSHOTS

(71) Applicant: Dell Products, L.P., Round Rock, TX (US)

(72) Inventor: Wai Chuen Yim, Merrimack, NH (US)

(73) Assignee: Dell Products, L.P., Round Rock, TX (US)

( * ) Notice: Subject to any disclaimer, the term of this patent is extended or adjusted under 35 U.S.C. 154(b) by 184 days.

(21) Appl. No.: 18/050,878

(22) Filed: Oct. 28, 2022

(65) Prior Publication Data
US 2024/0143758 A1    May 2, 2024

(51) Int. Cl.
*G06F 21/56* (2013.01)
*G06F 9/4401* (2018.01)
*G06F 21/57* (2013.01)

(52) U.S. Cl.
CPC .......... *G06F 21/565* (2013.01); *G06F 9/4401* (2013.01); *G06F 21/566* (2013.01); *G06F 21/572* (2013.01); *G06F 2221/034* (2013.01)

(58) Field of Classification Search
CPC .... G06F 21/565; G06F 9/4401; G06F 21/566; G06F 21/575; G06F 2221/034
USPC ...... 726/23, 22; 711/162; 707/639, 649, 650
See application file for complete search history.

(56) References Cited

U.S. PATENT DOCUMENTS

| | | | | |
|---|---|---|---|---|
| 6,205,450 B1 * | 3/2001 | Kanome | ............. | G06F 11/1435 707/999.203 |
| 7,031,986 B2 * | 4/2006 | Ito | ............. | G06F 16/21 714/6.32 |
| 7,921,461 B1 * | 4/2011 | Golchikov | ............. | G06F 21/575 726/25 |
| 8,082,407 B1 * | 12/2011 | Chatterjee | ............. | G06F 9/4416 707/639 |
| 8,732,417 B1 * | 5/2014 | Stringham | ............. | G06F 11/1458 711/E12.103 |
| 8,799,595 B1 * | 8/2014 | Chatterjee | ............. | G06F 11/1456 711/162 |
| 9,720,778 B2 * | 8/2017 | Mutalik | ............. | G06F 11/1446 |
| 11,449,388 B1 * | 9/2022 | Hoffman | ............. | G06F 3/0683 |
| 2005/0172093 A1 * | 8/2005 | Jain | ............. | G06F 3/0601 711/162 |
| 2012/0272021 A1 * | 10/2012 | Okada | ............. | G06F 3/065 711/E12.103 |

(Continued)

*Primary Examiner* — Kaylee J Huang
(74) *Attorney, Agent, or Firm* — Fogarty LLP

(57) ABSTRACT

An information handling system (IHS) smart network interface controller (SmartNIC) or storage device having a ransomware protection (engine) that paves an IHS by creating a secure snapshot of a boot device of the IHS, creating a read and writable snapshot from the secure snapshot, and exposing the read and writable snapshot of the secure snapshot to the IHS, through a unified extensible firmware interface (UEFI) or basic input/output system (BIOS) of the IHS, as a primary boot device. The ransomware protection (engine) may also repave the IHS by recreating the boot read and writable snapshot upon a reboot of the IHS, in response to receipt of a repave command (through a management interface of the SmartNIC), restoring the primary boot device to a known good state captured by the secure snapshot.

20 Claims, 10 Drawing Sheets

(56) References Cited

U.S. PATENT DOCUMENTS

| | | | | |
|---|---|---|---|---|
| 2014/0149665 A1* | 5/2014 | Ezra | ................ | G06F 3/0604 |
| | | | | 711/114 |
| 2018/0349133 A1* | 12/2018 | Wolf | ................ | G06F 16/11 |
| 2020/0159624 A1* | 5/2020 | Malkov | ................ | G06N 20/00 |

* cited by examiner

PAVE AND/OR REPAVE SYSTEMS AND METHODS USING RANSOMWARE PROTECTION SMART NETWORK INTERFACE CONTROLLER OR RANSOMWARE PROTECTION STORAGE DEVICE SECURE SNAPSHOTS

CROSS-REFERENCE TO RELATED APPLICATIONS

This disclosure is related to U.S. patent application Ser. No. 18/050,622, entitled Ransomware Protection Systems and Methods Leveraging Smart Network Interface Controllers, U.S. patent application Ser. No. 18/050,643, entitled Systems and Methods for Protecting Information Handling System Boot Using Smart Network Interface Controllers, and U.S. patent application Ser. No. 18/050,892, entitled Systems and Methods for Protecting Information Handling Systems Using a Ransomware Protection Storage Device, all of which are filed concurrent herewith, on Oct. 28, 2022, and each of which are incorporated herein by reference.

FIELD

This disclosure relates generally to Information Handling Systems (IHSs), more specifically to IHS paving and/or repaving, and particularly to (instantaneous) pave and/or repave systems and methods using ransomware protection smart network interface controller (SmartNIC) or ransomware protection storage device secure snapshots.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Due to constant increases in malware attacks, frequency of security vulnerability patching, and risk of configuration drifts, enterprises, such as banks, are trending toward a technique called "pave/repave." In essence, a pave/repave will initialize a system to a known state of the firmware, software, and configuration. Traditionally, these operations are carried out manually, using techniques such as installing images through Preboot eXecution Environment (PXE) or by (a) service professional(s) using media such as USB-attached drives, or the like.

More specifically, enterprises are facing challenges to meet security issues and compliance with rules to know and attest to their systems running proper firmware and software in their infrastructure. In order to meet such challenges, enterprises are moving toward pave/repave techniques, where the enterprise initialize or reinitialize their hardware and appliances to a predetermined known state, much more frequently than in the past. An implicit assumption of this process is not to trust what is running on the systems. As such, an external source is required to provide the known firmware and software. As noted, an example of such an approach is using a PXE server where the known good image is downloaded to the target IHS without relying on software running on the IHS. Another such technique is to (re)install, using an USB-media containing the known good image. These processes are slow, expensive, and prone to errors.

SUMMARY

Embodiments of systems and methods for protecting Information Handling Systems (IHSs) using a ransomware protection storage device are described. In an illustrative, non-limiting example an IHS smart network interface controller (SmartNIC) or storage device having a ransomware protection (engine) that paves an IHS by creating a secure snapshot of a boot device of the IHS, creating a read and writable snapshot from the secure snapshot, and exposing the read and writable snapshot of the secure snapshot to the IHS, through a unified extensible firmware interface (UEFI) or basic input/output system (BIOS) of the IHS, as a primary boot device. The read and writable snapshot may persist across reboots of the IHS, retaining modifications made to the boot device.

The ransomware protection (engine) may also repave the IHS by recreating the boot read and writable snapshot upon a reboot of the IHS, in response to receipt of a repave command (through a management interface of the SmartNIC), restoring the primary boot device to a known good state captured by the secure snapshot.

The ransomware protection (engine) may also provide the IHS boot protection from ransomware attacks, by creating a second read and writable snapshot from the secure snapshot, recreating the second read and writable snapshot from the secure snapshot on each reboot of the IHS, exposing the second read and writable snapshot to the IHS (through the UEFI or BIOS of the IHS, as an alternate boot device.

The ransomware protection (engine) may also update an operating environment of the IHS, upon receiving a firmware and/or software update package, by installing the firmware and/or software update on the boot device, and creating a new secure snapshot and corresponding read and writable snapshot for the primary and alternate boot devices. The ransomware protection (engine) may also retain the secure snapshot for reversion of the operating environment of the IHS.

The storage device may include an application specific integrated circuit (ASIC) that includes the ransomware protection, or may be coupled to such an ASIC that includes the ransomware protection the storage device. Alternatively, the storage device may include a memory controller that includes the ransomware protection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
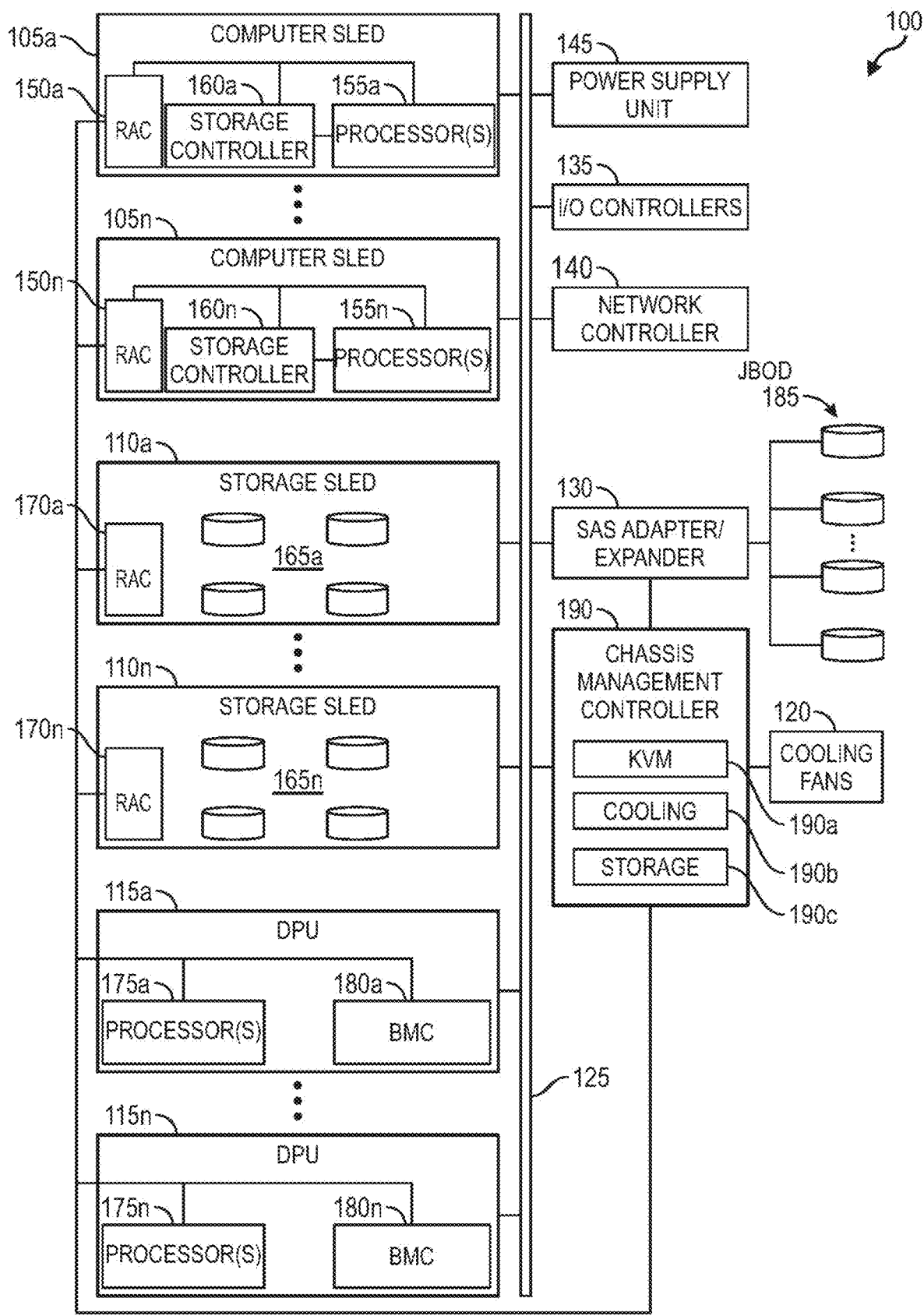
FIG. 1 is a diagram illustrating certain components of an example Information Handling Systems (IHS) server chassis, wherein embodiments of the present (instantaneous) pave and/or repave systems and methods using ransomware protection smart network interface controller (SmartNIC) or storage device secure snapshots may be employed, according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a server (e.g., compute sled, storage sled, blade server, etc.), an Enclosure Controller (EC) (e.g., an integrated modular server chassis remote access controller), a Graphics Processing Unit (GPU) card, a Data Processing Unit (DPU) card (e.g., a "smart" network interface controller (SmartNIC)), personal computer (e.g., desktop or laptop), tablet computer, mobile device (e.g., personal digital assistant (PDA) or smart phone), a network storage device, an Internet of Things (IoT) device or other end-point device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Embodiments of the present systems and methods are directed to (instantaneous) pave and/or repave of an IHS using ransomware protection SmartNIC or storage device secure snapshots. Such secure snapshots are, in accordance with various embodiments of the present systems and methods, provided by a ransomware protection SmartNIC and/or a ransomware protection storage device, such as an M.2 SSD, or the like, which provide (ransomware) protection for servers, appliances, and/or end point device operating environments through the use of such secure snapshots. In these implementations, a secure snapshot is implemented in a separate secure domain encompassed by the SmartNIC and/or M.2, with separate identity and access management system and policies from the host they are providing service to. To protect the boot and operating environment of the host, a secure snapshot is taken in a known good state. In the event of an attack, the secure snapshot is used to recover the boot and operating environment quickly. A particular feature of these implementations that is relevant to the present (instantaneous) pave and/or repave systems and methods is the use of read/writable snapshot of the secure snapshot as boot devices. The present techniques allow the secure snapshot to be used, without modification of host software, and without altering the secure snapshot for (instantaneous) pave and/or repave.

FIG. 1 is a block diagram illustrating certain components of an example IHS chassis 100 wherein embodiments of the present systems and methods for ransomware protection leveraging SmartNICs may be implemented, according to some embodiments. Chassis 100 may have one or more compute sleds 105*a-n*, one or more storage sleds 110*a-n* and/or one or more DPUs 115*a*-115*n*, deployed therein. For example, chassis 100 may be a modular IHS chassis, such as, by way of example a Dell® PowerEdge™ MX7000 modular chassis. Embodiments of chassis 100 may include a wide variety of different hardware configurations. Such variations in hardware configuration may result from chassis 100 being factory assembled to include components specified by a customer that has contracted for manufacture and delivery of chassis 100, or such variations in hardware configuration may result from customer (directed) installation of various compute sleds, storage sleds, DPUs, or the like in chassis 100 (over time).

Chassis 100 may include one or more bays that each receive an individual sled (that may be additionally or alternatively referred to as a tray, blade, and/or node), DPU, or the like, such as compute sleds 105*a-n*, storage sleds 110*a-n*, DPUs 115*a-n*, etc. Chassis 100 may support a variety of different numbers (e.g., 4, 8, 16, 32), sizes (e.g., single-width, double-width) and physical configurations of bays. Other embodiments may include additional types of sleds or DPUs that provide various types of storage and/or processing capabilities. Other types of sleds or DPUs may provide power management and networking functions. Sleds or DPUs may be individually installed and removed from chassis 100, thus allowing the computing and storage capabilities of a chassis to be reconfigured by swapping the sleds or DPUs with different types of sleds without affecting the operations of the other sleds or DPUs installed in the chassis 100.

Multiple chassis 100 may be housed within a rack. Data centers may utilize large numbers of racks, with different types of chassis installed in the various configurations of racks. The modular architecture provided by the sleds, DPUs, chassis, and rack allow for certain resources, such as cooling, power and network bandwidth, to be shared by compute sleds 105*a-n*, storage sleds 110*a-n*, and DPUs 115*a-n* thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within chassis 100 that is housed within the rack. Chassis 100 may alternatively or additionally include one or more cooling fans 120 that may be similarly operated to ventilate heated air from within sleds 105*a-n*, 110*a-n*, DPUs 115*a-n*, etc. installed within the chassis. Rack and chassis 100 installed within the rack may utilize various configurations and combinations of cooling fans to cool sleds 105*a-n*, 110*a-n*, DPUs 115*a-n* and other components housed within chassis 100.

Sleds 105*a-n*, 110*a-n*, DPUs 115*a-n*, etc. may be individually coupled to chassis 100 via connectors that correspond to the bays provided by chassis 100 and that physically and electrically couple an individual sled to backplane 125. Chassis backplane 125 may be a printed circuit board that includes electrical traces and connectors that are configured to route signals between the various components of chassis 100 that are connected to backplane 125.

Backplane 125 may include various additional components, such as cables, wires, midplanes, backplanes, connectors, expansion slots, and multiplexers. In certain implementations, backplane 125 may be a motherboard that includes various electronic components installed thereon. Such components installed on backplane 125 may include components that implement all or part of the operations described with regard to the Serial Attached SCSI (SAS) expander 130, I/O controllers 135, network controller 140 and power supply unit (PSU) 145.

Figure 2:
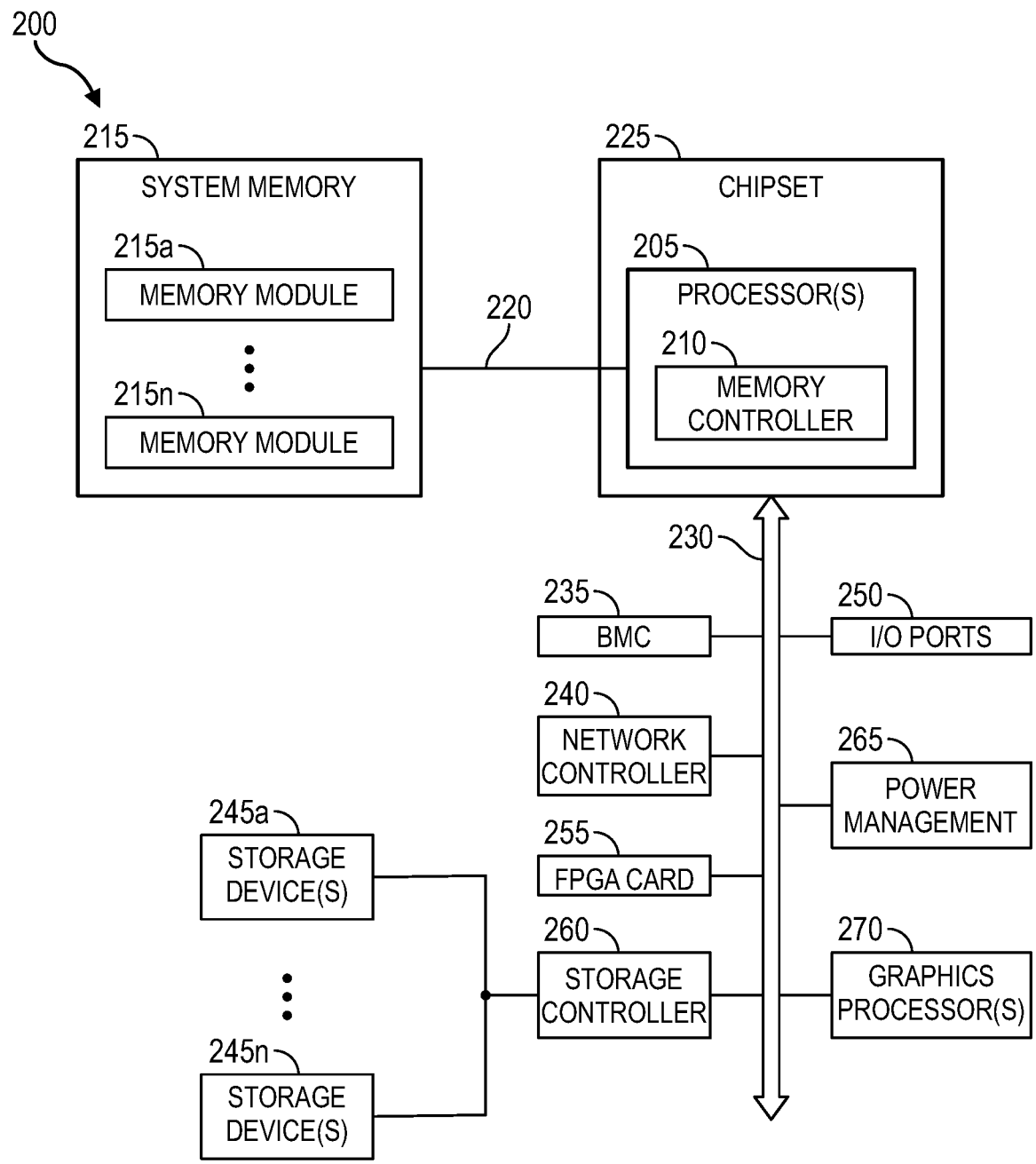
FIG. 2 is a block diagram illustrating components of an example of an IHS, such as a server, with which embodiments of the present (instantaneous) pave and/or repave systems and methods using ransomware protection SmartNIC or storage device secure snapshots may be employed, according to some embodiments.

Each of compute sleds 105*a-n* may be an IHS such as described with regard to IHS 200 of FIG. 2. Each of compute sleds 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. Compute sleds 105*a-n* may be configured for general-purpose computing or may be optimized for specific computing tasks.

As illustrated, each of compute sleds 105*a-n* may include a respective Remote Access Controller (RAC) 150*a-n*. Each of RACs 150*a-n* may be a BMC, or the like and provides capabilities for remote monitoring and management of a corresponding one of compute sleds 105*a-n*. In support of these monitoring and management operations, RACs 150*a-n* may utilize both in-band and sideband (i.e., out-of-band) communications with various components of compute sleds 105*a-n* and chassis 100. RACs 150*a-n* may collect various types of sensor data, such as collecting temperature sensor readings that are used in support of airflow cooling of the chassis 100 and the sleds 105*a-n*, 110*a-n*, DPUs 115*a-n*, etc. In addition, each of RACs 150*a-n* may implement various functions related to compute sleds 105*a-n* that utilize sideband bus connections with various internal components thereof. As a non-limiting example of a RAC, the integrated Dell RAC (iDRAC) from Dell® is embedded within Dell PowerEdge™ servers and provides functionality that helps information technology (IT) administrators deploy, update, monitor, and maintain servers remotely. Each of the compute sleds 105*a-n* may utilize one or more system processors 155*a-n*, that may be referred to as CPUs (central processing units) and that may be assigned computing tasks, such as via respective RAC 150*a-n*. In some embodiments, CPUs 155*a-n* may each include a plurality of processing cores that may be separately assigned computing tasks. Each of the compute sleds 105*a-n* may also include respective one of storage controllers 160*a-n* that may be utilized to access storage drives that are accessible via chassis 100. Some individual storage controllers 160*a-n* may provide support for Redundant Array of Independent Disks (RAID) configurations of logical and physical storage drives, such as storage drives provided by storage sleds 110*a-n*. Some or all individual storage controllers 160*a-n* may be Host Bus Adapters (HBAs) that provide more limited capabilities in accessing physical storage drives provided via storage sleds 110*a-n* and/or via SAS expander 130.

As illustrated, chassis 100 may also include one or more storage sleds 110*a-n* that are coupled to backplane 125 and installed within one or more bays of chassis 100 in a similar manner to compute sleds 105*a-n*. Each of individual storage sleds 110*a-n* may include different numbers and types of storage devices 165*a-n*. For instance, storage sleds 110*a-n* may include SAS magnetic disk drives, Serial Advanced Technology Attachment (SATA) magnetic disk drives, solid-state drives (SSDs), and other types of storage drives in various combinations. Storage sleds 110*a-n* may be utilized in various storage configurations by compute sleds 105*a-n* that are coupled to chassis 100. As illustrated, each storage sled 110*a-n* includes RAC 170*a-n*, which may also be BMCs, to provide capabilities for remote monitoring and management. Again, as a non-limiting example of a RAC, the integrated Dell RAC (iDRAC) from Dell® is embedded within Dell PowerEdge™ devices and provides functionality that helps information technology (IT) administrators deploy, update, monitor, and maintain devices remotely.

In some implementations, processing tasks may be allocated for processing to a specific processing unit, such as to DPUs 115*a-n*, which are supplementary processors that operate separate from the one or more main CPUs 155*a-n* of compute sleds 105*a-n*, or the like. Each of the DPUs 115*a-n* may include respective programmable processor 175*a-n* that can be configured for offloading functions from CPUs 155*a-n*. In some instances, DPUs 115*a-n* may be programmed to offload functions that support the operation of devices or systems that are coupled in chassis 100 thus sparing CPUs 155*a-n* from a significant number of interrupts required to support these devices and gaining efficiency through the use of specialized implementations of these offloaded functions that can be achieved using the programmable logic of the DPUs 155a-n. In some embodiments, DPU processors 175a-n may each include a plurality of programmable processing cores and/or hardware accelerators, that may be used to implement functions used to support devices in chassis. In some embodiments, the processing cores of DPU processor 175a-n may include ARM (advanced RISC (reduced instruction set computing) machine) processing cores. In other embodiments, the cores of DPU processor 175a-n may include MIPS (microprocessor without interlocked pipeline stages) cores, RISC-V cores, or CISC (complex instruction set computing) (i.e., x86) cores. Each core of the DPU processor 175a-n may be programmed to perform separate functions that support operation of chassis devices. In some embodiments, DPUs 115a-n may be implemented through integrated circuits mounted on a printed circuit board (e.g., a replaceable card) that is coupled to backplane 125, or the like. In various embodiments, DPUs 115a-n may manage high-bandwidth connections with networking devices in implementing functions of a network switch, compression and codec functions, virtualization operations or cryptographic functions. As shown, each of DPUs 115a-n may also include a respective BMC 180a-n to provide capabilities for (remote) monitoring and management of various aspects of the DPU. In support of these operations, BMCs 180a-n may utilize both in-band, sideband and/or out of band communications with certain managed components of respective DPU, such as, for example, processor(s) 175a-n. BMCs 180a-n may each include non-volatile memory having program instructions stored thereon that are usable by CPUs 175a-n to enable (remote) management of the respective DPU.

In addition to the data storage capabilities provided by storage sleds 110a-n, chassis 100 may provide access to other storage resources that may be installed components of chassis 100 and/or may be installed elsewhere within a rack housing the chassis 100, such as within a storage blade. In certain scenarios, such storage resources 185 may be accessed via SAS expander 130 coupled to the backplane 125. SAS expander 130 may support connections to a number of Just a Bunch Of Disks (JBOD) storage drives 185 that may be configured and managed individually and without implementing data redundancy across drives 185. Additional storage resources 185 may also be at various other locations within a datacenter in which chassis 100 is installed. Such additional storage resources 185 may also be remotely located.

As illustrated, chassis 100 of FIG. 1 may include a network controller 140 that provides network access to the sleds 105a-n, 110a-n, DPUs 115a-n, etc. installed within the chassis. Network controller 140 may include various switches, adapters, controllers and couplings used to connect chassis 100 to a network, either directly or via additional networking components and connections provided via a rack in which chassis 100 is installed.

Chassis 100 may similarly include PSU 145 that provides the components of the chassis with various levels of DC power from an AC power source or from power delivered via a power system provided by a rack within which chassis 100 may be installed. In certain embodiments, PSU 145 may be implemented within a sled that may provide chassis 100 with redundant, hot-swappable PSUs.

Chassis 100 may also include various I/O controllers 135 that may support various I/O ports, such as USB ports that may be used to support keyboard and mouse inputs and/or video display capabilities. Such I/O controllers 135 may be utilized by chassis management controller (CMC) 190, which may variously be referred to herein as a "chassis integrated remote access controller," or the like, to support various KVM (Keyboard, Video and Mouse) 190a capabilities that provide administrators with the ability to interface with the chassis 100. To wit, CMC 125 may provide a system management console via KVM 190a to enable such capabilities that provide administrators with the ability to interface with the chassis 100. One example of such a system management console is the Dell® OpenManage Enterprise (OME) systems management console. In some embodiments, a system management console may be deployed on a secure virtual machine (VM), such as a VMWARE Workstation appliance. CMC 190 may also include storage module 190c that provides capabilities for managing and configuring certain aspects of the storage devices of chassis 100, such as the storage devices provided within storage sleds 110a-n and within JBOD 185, as well as other aspects of chassis devices such as compute sleds 105a-n, DPUs 115a-n, etc., and other components of chassis 100. In addition to providing support for KVM 190a capabilities for administering chassis 100, CMC 190 may support various additional functions for sharing the infrastructure resources of chassis 100. In some scenarios, CMC 190 may implement tools for managing power 145, network bandwidth 140, and airflow cooling 120 available via chassis 100. For example, airflow cooling 120 may be provided by a rack in which chassis 100 may be installed and managed by cooling module 190b of CMC 190.

FIG. 2 shows an example of an IHS 200 configured to implement systems and methods described herein for ransomware protection leveraging SmartNICs, according to some embodiments. It should be appreciated that although the embodiments described herein may describe an IHS that is a compute sled, storage sled, DPU (e.g., a SmartNIC), or similar computing component that may be deployed within the bays of a chassis (100), other embodiments may be utilized with other types of IHSs that may also support ransomware protection leveraging SmartNICs. In the example of FIG. 2, IHS 200 may be a computing component, such as compute sled 105a-n or other type of server, such as an 1RU server installed within a 2RU chassis, that is configured to share infrastructure resources provided by chassis 100. In other examples, storage sleds 110a-n, DPUs 115a-n, and/or the like, may each include a number of the components described as a part of IHS 200.

Thus, IHS 200 of FIG. 2 may be a compute sled, storage sled, DPU, or similar computing component, such as compute sleds 105a-n, storage sleds 110a-n and/or DPUs 115a-n of FIG. 1, that may be installed within a chassis (100), that may in turn be installed within a rack. Installed in this manner, IHS 200 may utilize shared power, network and cooling resources provided by the chassis and/or rack. Embodiments of IHS 200 may include a wide variety of different hardware configurations.

However, IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 210 that may be implemented directly within the circuitry of the processor 205, or the memory controller 210 may be a separate integrated circuit that is located on the same die as the processor 205. The memory controller 210 may be configured to manage the transfer of data to and from the system memory 215 of the IHS 205 via a high-speed memory interface 220. The system memory 215 is coupled to processor(s) 205 via a memory bus 220 that provides the processor(s) 205 with high-speed memory used in the execution of computer program instructions by the processor(s) 205. Accordingly, system memory 215 may include memory components, such as static RAM (SRAM), dynamic RAM (DRAM), NAND Flash memory, suitable for supporting high-speed memory operations by the processor(s) 205. In certain embodiments, system memory 215 may combine both persistent, non-volatile memory and volatile memory.

In certain embodiments, the system memory 215 may be comprised of multiple removable memory modules. The system memory 215 of the illustrated embodiment includes removable memory modules 215*a-n*. Each of the removable memory modules 215*a-n* may correspond to a printed circuit board memory socket that receives a removable memory module 215*a-n*, such as a DIMM (Dual In-line Memory Module), that can be coupled to the socket and then decoupled from the socket as needed, such as to upgrade memory capabilities or to replace faulty memory modules. Other embodiments of IHS memory 215 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize chipset 225 that may be implemented by integrated circuits that are coupled to processor(s) 205. In this embodiment, processor(s) 205 is depicted as a component of chipset 225. In other embodiments, all of chipset 225, or portions of chipset 225 may be implemented directly within the integrated circuitry of processor(s) 205. The chipset may provide the processor(s) 205 with access to a variety of resources accessible via one or more buses 230. Various embodiments may utilize any number of buses to provide the illustrated pathways served by bus 230. In certain embodiments, bus 230 may include a PCIe switch fabric that is accessed via a PCIe root complex.

As illustrated, IHS 200 includes BMC 235 to provide capabilities for remote monitoring and management of various aspects of IHS 200. In support of these operations, BMC 235 may utilize both in-band, sideband and/or out of band communications with certain managed components of IHS 200, such as, for example, processor(s) 205, system memory 215, chipset 225, network controller 240, storage device(s) 245, etc. BMC 235 may be installed on the motherboard of IHS 200 or may be coupled to IHS 200 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 235 may include non-volatile memory having program instructions stored thereon that are usable by CPU(s) 205 to enable remote management of IHS 200. For example, BMC 235 may enable a user to discover, configure, and manage BMC 235, setup configuration options, resolve and administer hardware or software problems, etc. Additionally, or alternatively, BMC 235 may include one or more firmware volumes, each volume having one or more firmware files used by the BIOS' firmware interface to initialize and test components of IHS 200.

IHS 200 may also include the one or more I/O ports 250, such as USB ports, PCIe ports, TPM (Trusted Platform Module) connection ports, HDMI ports, audio ports, docking ports, network ports, Fibre Channel ports and other storage device ports. Such I/O ports 250 may be externally accessible or may be internal ports that are accessed by opening the enclosure of the IHS 200. Through couplings made to these I/O ports 250, users may couple the IHS 200 directly to other IHSs, storage resources, external networks and a vast variety of peripheral components, such as including in accordance with embodiments of the present systems and methods, a SmartNIC.

As illustrated, IHS 200 may include one or more FPGA (Field-Programmable Gate Array) cards 255. Each of the FPGA card 255 supported by IHS 200 may include various processing and memory resources, in addition to an FPGA logic unit that may include circuits that can be reconfigured after deployment of IHS 200 through programming functions supported by the FPGA card 255. Through such reprogramming of such logic units, each individual FGPA card 255 may be optimized to perform specific processing tasks, such as specific signal processing, security, data mining, and Artificial Intelligence (AI) functions, and/or to support specific hardware coupled to IHS 200. In some embodiments, a single FPGA card 255 may include multiple FPGA logic units, each of which may be separately programmed to implement different computing operations, such as in computing different operations that are being offloaded from processor 205.

IHS 200 may include one or more storage controllers 260 that may be utilized to access storage devices 245*a-n* that are accessible via the chassis in which IHS 200 is installed. Storage controller 260 may provide support for RAID configurations of logical and physical storage devices 245*a-n*. In some embodiments, storage controller 260 may be an HBA (Host Bus Adapter) that provides more limited capabilities in accessing physical storage devices 245*a-n*. In some embodiments, storage devices 245*a-n* may be replaceable, hot-swappable storage devices that are installed within bays provided by the chassis in which IHS 200 is installed. In embodiments where storage devices 245*a-n* are hot-swappable devices that are received by bays of chassis, the storage devices 245*a-n* may be coupled to IHS 200 via couplings between the bays of the chassis and a midplane of IHS 200. In some embodiments, storage devices 245*a-n* may also be accessed by other IHSs that are also installed within the same chassis as IHS 200. Storage devices 245*a-n* may include SAS (Serial Attached SCSI) magnetic disk drives, SATA (Serial Advanced Technology Attachment) magnetic disk drives, solid-state drives (SSDs) and other types of storage devices in various combinations.

Processor(s) 205 may also be coupled to a network controller 240 via bus 230, such as provided by a Network Interface Controller (NIC) that allows the IHS 200 to communicate via an external network, such as the Internet or a LAN. In some embodiments, network controller 240 may be a replaceable expansion card or adapter that is coupled to a motherboard connector of IHS 200. In some embodiments, network controller 240 may be an integrated component of IHS 200. However, in accordance with embodiments of the present systems and methods, a SmartNIC DPU may, as noted, be deployed in the same chassis (100) as IHS 200, or in another chassis, rack, or the like. Such a SmartNIC, is a programmable accelerator that makes data center networking, security and storage efficient and flexible and may offload from server CPU(s) (205) tasks related to networking, data movement, data storage, communication, etc.

A variety of additional components may be coupled to processor(s) 205 via bus 230. For instance, processor(s) 205 may also be coupled to power management unit 265 that may interface with power system unit 145 of chassis 100 in which IHS 200 is installed. In certain implementations, graphics processor 270 may be comprised within one or more video or graphics cards, or an embedded controller, installed as components of the IHS 200. In certain embodiments, a graphics processor 270 may be comprised within one or more video or graphics cards, or an embedded controller, installed as components of the IHS 200.

In certain embodiments, IHS 200 may operate using a BIOS (Basic Input/Output System) that may be stored in a non-volatile memory accessible by the processor(s) 205. The BIOS may provide an abstraction layer by which the operating system (OS) of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an OS for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 235. In some embodiments, BIOS may be configured to identify hardware components that are detected as being currently installed in IHS 200. In such instances, the BIOS may support queries that provide the described unique identifiers that have been associated with each of these detected hardware components by their respective manufacturers. In providing an abstraction layer by which hardware of IHS 200 is accessed by an OS, BIOS may identify the I/O ports 250 that are recognized and available for use.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 200 of FIG. 2 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with IHS 200 of FIG. 2.

Figure 3:
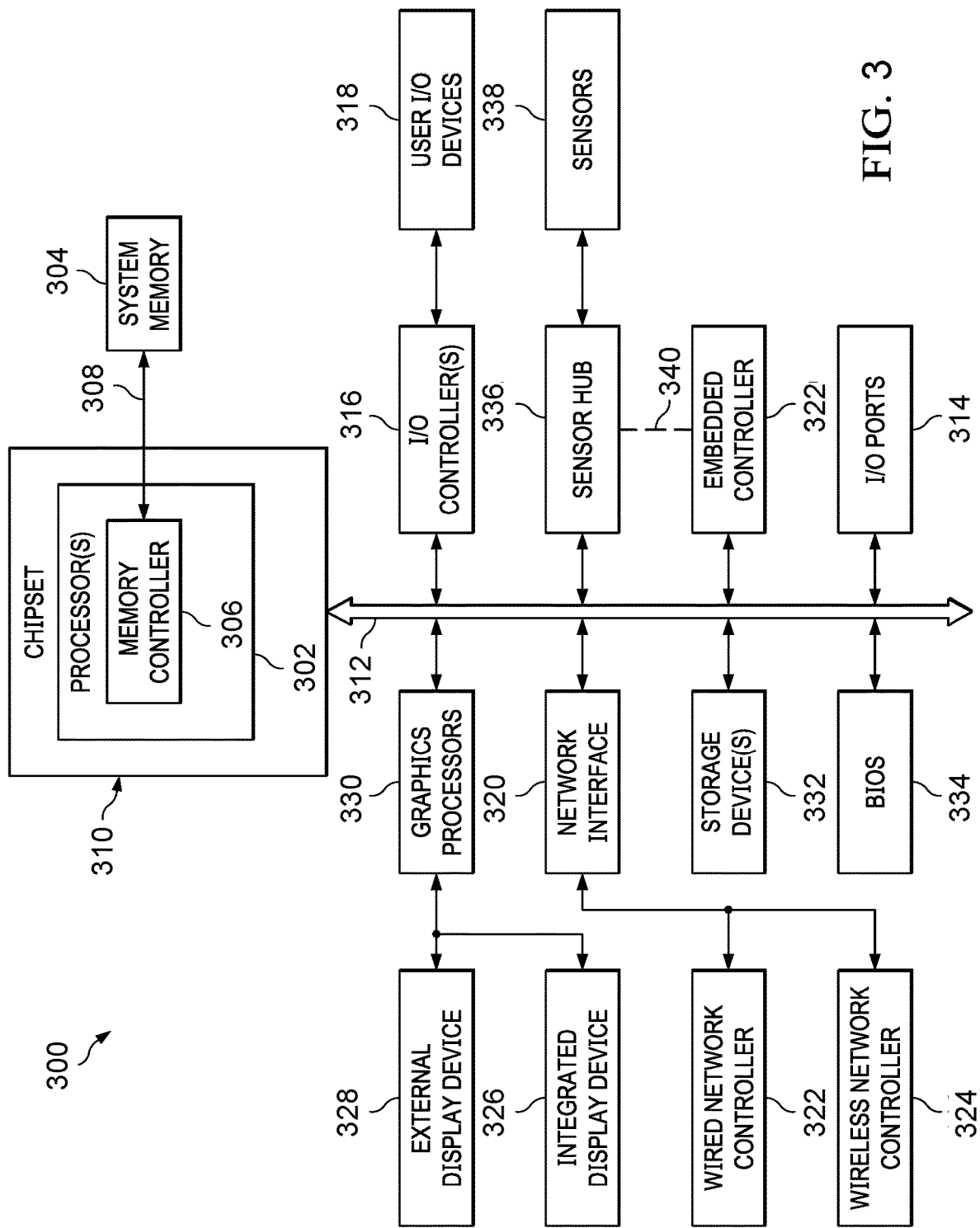
FIG. 3 is a block diagram illustrating components of an example of an IHS, such as an end point device, or the like, with which embodiments of the present (instantaneous) pave and/or repave systems and methods using ransomware protection SmartNIC or storage device secure snapshots may be employed, according to some embodiments.

FIG. 3 is a block diagram of an example of internal components of (end-point device) IHS 300, according to some embodiments. As shown, IHS 300 includes one or more processors 302, such as a Central Processing Unit (CPU), that execute code retrieved from system memory 304. Although IHS 300 is illustrated with a single processor 302, other embodiments may include two or more processors, that may each be configured identically, or to provide specialized processing operations. Processor(s) 302 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC °, or MIPS® ISAs, or any other suitable ISA.

In the embodiment of FIG. 1, processor(s) 302 includes memory controller 306 that may be implemented directly within the circuitry of processor(s) 302, or memory controller 306 may be a separate integrated circuit that is located on the same die as processor(s) 302. Memory controller 306 may be configured to manage the transfer of data to and from the system memory 304 of IHS 300 via high-speed memory interface 308. System memory 304 coupled to processor(s) 302 provides processor(s) 302 with a high-speed memory that may be used in the execution of computer program instructions by processor(s) 302. Accordingly, system memory 304 may include memory components, such as static RAM (SRAM), dynamic RAM (DRAM), NAND Flash memory, suitable for supporting high-speed memory operations by processor(s) 302. In certain embodiments, system memory 304 may combine both persistent, non-volatile memory and volatile memory. In certain embodiments, system memory 304 may include multiple removable memory modules.

IHS 300 utilizes chipset 310 that may include one or more integrated circuits that are connected to processor(s) 302. In the embodiment of FIG. 1, processor(s) 302 is depicted as a component of chipset 310. In other embodiments, all of chipset 310, or portions of chipset 310 may be implemented directly within the integrated circuitry of processor(s) 302. Chipset 310 provides processor(s) 302 with access to a variety of resources accessible via bus 312. In IHS 300, bus 312 is illustrated as a single element. Various embodiments may utilize any number of separate buses to provide the illustrated pathways served by bus 312.

In various embodiments, IHS 300 may include one or more I/O ports 314 that may support removeable couplings with various types of external devices and systems, including removeable couplings with peripheral devices that may be configured for operation by a particular user of IHS 300. For instance, I/O ports 314 may include USB (Universal Serial Bus) ports, by which a variety of external devices may be coupled to IHS 300. In addition to or instead of USB ports, I/O ports 314 may include various types of physical I/O ports that are accessible to a user via the enclosure of IHS 300.

In certain embodiments, chipset 310 may additionally utilize one or more I/O controllers 316 that may each support the operation of hardware components such as user I/O devices 318 that may include peripheral components physically coupled to I/O port 314 and/or peripheral components that are wirelessly coupled to IHS 300 via network interface 320. In various implementations, I/O controller 316 may support the operation of one or more user I/O devices 318 such as a keyboard, mouse, touchpad, touchscreen, microphone, speakers, camera and other input and output devices that may be coupled to IHS 300. User I/O devices 318 may interface with an I/O controller 316 through wired or wireless couplings supported by IHS 300. In some cases, I/O controllers 316 may support configurable operation of supported peripheral devices, such as user I/O devices 318.

As illustrated, a variety of additional resources may be coupled to processor(s) 302 of IHS 300 through chipset 310. For instance, chipset 310 may be coupled to network interface 320 that may support different types of network connectivity. IHS 300 may also include one or more Network Interface Controllers (NICs) 322 and 324, each of which may implement the hardware required for communicating via a specific networking technology, such as BLUETOOTH, in accordance with various embodiments of the present systems and methods, Wi-Fi, Ethernet and mobile cellular networks (e.g., CDMA, TDMA, LTE). Network interface 320 may support network connections by wired network controllers 322 and wireless network controllers 324. Each network controller 322 and 324 may be coupled via various buses to chipset 310 to support different types of network connectivity, such as the network connectivity utilized by IHS 300.

As illustrated, IHS 300 may support integrated display device 326, such as a display integrated into a laptop, tablet, 2-in-1 convertible device, or mobile device. IHS 300 may also support use of one or more external displays 328, such as external monitors that may be coupled to IHS 300 via various types of couplings, such as by connecting a cable from the external display 328 to external I/O port 328 of the IHS 300. One or more display devices 326 and/or 328 coupled to IHS 300 may utilize LCD, LED, OLED, or other display technologies. Each display device 326 and 328 may be capable of receiving touch inputs such as via a touch controller that may be an embedded component of display device 326 and/or 328 or graphics processor 330, or it may be a separate component of IHS 300 accessed via bus 312. In some cases, power to graphics processor 330, integrated display device 326 and/or external display 328 may be turned off or configured to operate at minimal power levels in response to IHS 300 entering a low-power state (e.g., standby). In certain scenarios, the operation of integrated displays 326 and external displays 328 may be configured for a particular user. For instance, a particular user may prefer specific brightness settings that may vary the display brightness based on time of day and ambient lighting conditions. As such, chipset 310 may provide access to one or more display device(s) 326 and/or 328 via graphics processor 330. Graphics processor 330 may be included within a video card, graphics card or within an embedded controller installed within IHS 300. Additionally, or alternatively, graphics processor 330 may be integrated within processor(s) 302, such as a component of a system-on-chip (SoC). Graphics processor 330 may generate display information and provide the generated information to one or more display device(s) 326 and/or 328, coupled to IHS 300.

Chipset 310 also provides processor(s) 302 with access to one or more storage devices 332. In various embodiments, storage device 332 may be integral to IHS 300 or may be external to IHS 300. In certain embodiments, storage device 332 may be accessed via a storage controller that may be an integrated component of the storage device. Storage device 332 may be implemented using any memory technology allowing IHS 300 to store and retrieve data. For instance, storage device 332 may be a magnetic hard disk storage drive or a solid-state storage drive. In certain embodiments, storage device 332 may be a system of storage devices, such as a cloud system or enterprise data management system that is accessible via network interface 320. Generally speaking, "M.2" is a specification for internally mounted computer expansion cards and associated connectors. The M.2 specification supports Non-Volatile Memory express (NVMe) as the logical device interface for M.2 PCI Express SSDs. Embodiments of the present systems and methods are described herein with respect to an M.2 SSD, or the like, which is typically a NVMe device connected to a PCIe bus (312).

As illustrated, IHS 300 also includes Basic Input/Output System (BIOS) 334 that may be stored in a non-volatile memory accessible by chipset 310 via bus 312. Upon powering or restarting IHS 300, processor(s) 302 may utilize BIOS 334 instructions to initialize and test hardware components coupled to the IHS 300. BIOS 334 instructions may also load an OS (e.g., WINDOWS, MACOS, iOS, ANDROID, LINUX, etc.) for use by IHS 300. BIOS 334 provides an abstraction layer that allows the operating system to interface with the hardware components of the IHS 300. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 300 embodiments may utilize sensor hub 336 capable of sampling and/or collecting data from a variety of hardware sensors 338. Sensors may provide access to data describing environmental and operating conditions of IHS 300 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 302 may receive and/or produce context information using sensors 338 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 300, a physical keyboard external to IHS 300, or an on-screen keyboard), whether the user operating the keyboard is typing with one or two hands (e.g., holding a stylus, or the like), a time of day, software application(s) under execution in focus for receiving keyboard input, whether IHS 300 is inside or outside of a carrying bag, ambient lighting, a battery charge level, whether IHS 300 is operating from battery power or is plugged into an AC power source (e.g., whether the IHS is operating in AC-only mode, DC-only mode, or AC+DC mode), a power consumption of various components of IHS 300 (e.g., CPU 302, GPU 330, system memory 304, etc.), an operating temperature of components of IHS 300, such as CPU temperature, memory module temperature, etc. In certain embodiments, sensor hub 336 may be an independent microcontroller or other logic unit that is coupled to the motherboard of IHS 300. Sensor hub 336 may be a component of an integrated system-on-chip incorporated into processor 302, and it may communicate with chipset 310 via a bus connection such as an Inter-Integrated Circuit (I2C) bus or other suitable type of bus connection. Sensor hub 336 may also utilize an I2C bus for communicating with various sensors supported by IHS 300.

As illustrated, IHS 300 may utilize embedded controller (EC) 340, which may be a motherboard component of IHS 300 and may include one or more logic units. In certain embodiments, EC 340 may operate from a separate power plane from the main processors 302 and thus the OS operations of IHS 300. Firmware instructions utilized by EC 340 may be used to operate a secure execution system that may include operations for providing various core functions of IHS 300, such as power management, management of operating modes in which IHS 300 may be physically configured and support for certain integrated I/O functions. In some embodiments, EC 340 and sensor hub 336 may communicate via an out-of-band signaling pathway or bus 324.

In various embodiments, IHS 300 may not include each of the components shown in FIG. 1. Additionally, or alternatively, IHS 300 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 302 as an SoC. Additionally, or alternatively, the subject (endpoint) IHS (e.g., an IoT device) may be, or at least employ, a single board computer or the like.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 300 of FIG. 3 is only one example of a system in which the certain embodiments may be utilized. Indeed, the embodiments described herein may be used in various further electronic devices, such as network router devices, televisions, custom telecommunications equipment for special purpose use, etc. That is, certain techniques described herein are in no way limited to use with IHS 300 as illustrated in FIG. 3.

Embodiments of the present systems and methods are directed to use of ransomware protection, and is some embodiments to use of ransomware protection leveraging SmartNICs. As noted above SmartNICs are a type of DPU (card), or the like, such as may deployed in a IHS chassis, or the like, alongside one or more compute sleds, storage sleds, blade servers, etc. Such leveraging of SmartNICs provides effective ransomware protection, with coordinated data protection, ransomware detection in the data path, and intelligent operational controls and policies, by implementing ransomware protection as part of a storage SmartNIC. Thusly, under embodiments of the present systems and methods, pave and/or repave may be provided in a centralized fashion for a SmartNIC. A storage SmartNIC provides a convenient central point from which to apply pave and/or repave operations, as all data being stored and retrieved by an IHS that employs a SmartNIC, goes through that SmartNIC.

Additionally, embodiments of the present systems and methods are OS and virtualization agnostic. That is, since a SmartNIC provides storage to an IHS (server) through the IHS buses, such as PCIe, as discussed above, OSs or virtualization platforms installed on the IHS discover storage devices through well-established standard storage protocols. Embodiments of the present systems and methods are likewise backend storage architecture agnostic, in that a SmartNIC can implement various types of storage backends, such as traditional RAIDs or distributed network-based storage.

Embodiments of the present systems and methods offload compute resources. Ransomware detection often requires intense compute and memory resources. As noted, the present embodiments for pave and/or repave may leverage a SmartNIC. That is, embodiments of the present systems and methods use a SmartNIC to impliment, and may thereby offload, pave and/or repave operations, to one degree or another, to the SmartNIC. Also, embodiments of the present systems and methods separate the security domain and the IHS's credentials. Thus, under embodiments of the present systems and methods, since the SmartNIC is a separate compute complex and has separate management credentials, it is well suited to perform, or at least facilitate pave and/or repave operations.

Figure 4:
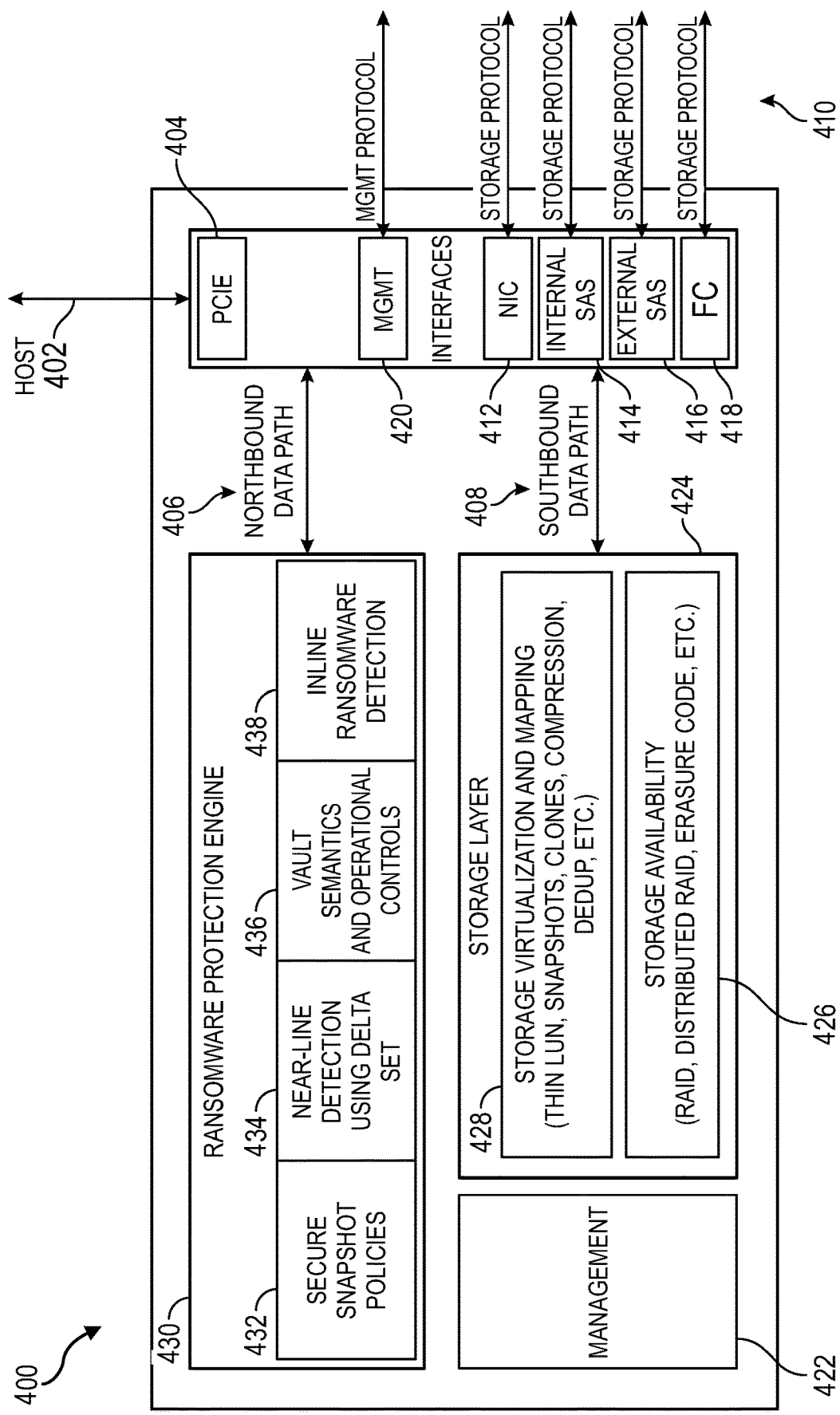
FIG. 4 is a block diagram illustrating an example ransomware protection SmartNIC, which may be employed in the present (instantaneous) pave and/or repave systems and methods using ransomware protection SmartNIC or storage device secure snapshots, according to some embodiments.

FIG. 4 is a block diagram illustrating ransomware protection SmartNIC 400, according to some embodiments. As typical of a SmartNIC, a host sees, via 402, storage objects through PCIe bus 404. Data traveling between the server (host) and the SmartNIC goes through this interface, also referred to herein as northbound data path 406. To provide storage function, SmartNIC also has southbound data path(s) 408 to storage devices such, as solid-state drives. Multiple southbound storage protocols 410 may be supported, via SmartNIC 400 such as network storage through a (conventional) NIC 412, Direct Attached Storage (DAS) through internal SAS interface 414, SAS attached JBOD (185) through external SAS interface 416, or even high-performance storage interfaces such as Fiber Channel (FC) 418 or InfiniBand. In some cases, a combination of interfaces may be used. For instance, distributed backend storage may go through NIC 412 for peer traffic and another interface to storage, such as internal SAS interface 414. Management interface 420 has a separate identity and access to management configuration 422 to provide a SmartNIC security domain in accordance with embodiments of the present systems and methods.

Storage layer 424 provides more-or-less traditional storage availability 426 and storage virtualization and mapping 428 functions. Storage availability 426 may be provided via, traditional RAID, distributed RAID, erasure code, etc. For example, storage availability 426 may function to provide the features of a RAID, a distributed RAID, availability through erasure coding, or even raw storage, such as, with no availability protection when a use case does not require storage availability. With respect to embodiments of the present systems and methods, storage virtualization and mapping 428 may enable a primary function for ransomware protection in accordance with embodiments of the present systems and methods by providing a channel for taking not only more-or less conventional snapshots, but also secure snapshots, of data objects, in accordance with embodiments of the present systems and methods. In addition, other storage virtualization such as (thin) Logical Unit Number (LUN)) provisioned storage objects, clones, compression, deduplication, etc. are all more-or-less traditional advantageous features to have in a storage SmartNIC.

Ransomware protection engine 430, implemented in accordance with embodiments of the present systems and methods on top of storage layer 424, is made up of secure snapshot policies 432, near-line detection 434 using delta set of the data, vault semantics and operational controls 436, and inline ransomware detection 438.

Secure snapshot policy engine 432 implements secure snapshots, which are each a point in time image of a storage object. This secure snapshot cannot be deleted until a retention timer has expired. In various embodiments of the present systems and methods, one purpose of a secure snapshot is to ensure that this data can be restored in case it is encrypted or destroyed by a cyber-attack. While the snapshot feature is provided by storage virtualization layer 428, the policies of when the secure snapshots are taken are hosted in secure snapshot policy engine module 432. An example of a secure snapshot policy used in accordance with embodiments of the present systems and methods is to create a secure snapshot when inline ransomware detection 440 identifies an attack.

Near-line detection 434 uses periodic snapshots to evaluate the probability of a ransomware attack based on a delta change set in consecutive snapshots. The detection can be based on thresholds of multiple factors, such as, by way of example, significant change of entropy of the data in a given data block, compressibility and deduplicability of the data and/or change of data reduction ratio, etc. and/or based on Machine Learning (ML) algorithms. Near-line detection using snapshot provides a time window to detect ransomware activities with more accuracy. Some aspects of such detection of a ransomware attack are disclosed in co-owned, co-pending U.S. application Ser. No. 17/714,689, entitled "Block-Based Protection from Ransomware," filed Apr. 6, 2022, the disclosure of which is incorporated herein, by reference. For example, embodiments of the present systems and methods may employ techniques for detecting ransomware attacks that identify a set of suspect blocks written to a data object between first and second points in time (i.e., between snapshots), and in response, secure a state of the data object as of the first point in time, in accordance with embodiments of the present systems and methods.

Vault semantics and operational controls 436 ensure that data is locked and isolated from access by an air gap. Updates to the vault is only allowed at specific scheduled time slots. In the context of the present ransomware protection leveraging SmartNIC 400, these vault operational controls can be applied to the data in the secured domain, as management functions for secure snapshots to implement aspects of the present systems and methods. These operational controls include, but are not limited to, fine grain access control, defining a security officer role, time-based or interface-based management command restrictions, etc.

Inline detection 438 leverages AI and/or ML algorithms to detect ransomware attacks in real-time. This feature provides the ability to react to cyber-attacks quickly. Upon detection, policies, such as stopping incoming writes, or taking a secure snapshot may be carried out by ransomware protection engine 430, such as, secure snapshot policy engine 432.

In embodiments of the present systems and methods the foregoing may be implemented in an "out of band" manner, such that an application on the server (200), or even the server itself, is unaware, and under normal operation, unaffected. A ransomware protection SmartNIC has a separate security domain from the server, providing an operator of the server an extra layer of protection and fast recovery from ransomware attacks that involve the server boot device, a robust defense strategy where the server can return to full operating capacity with a reboot even in the presence of a cyber-attack. Thusly, not only may ransomware protection leveraging SmartNICs provide effective ransomware protection, with coordinated data protection, ransomware detection in the data path, and intelligent operational controls and policies, by implementing ransomware protection as part of a storage SmartNIC, but also protection of the operating environment of an IHS, such as by, at least in part, through use of pave and repave operations, in accordance with embodiments of the present systems and methods.

In accordance with the forgoing, a SmartNIC is a particularly well-suited platform for not only ransomware (boot) protection, but also for pave and repave operations, in accordance with embodiments of the present systems and methods. On one hand, it has the capability to offload significant computes and resources for not only ransomware detection, but also pave and repave operations, in accordance with embodiments of the present systems and methods. On the other hand, it has a separate security domain from the server, and therefore, provides isolation from cyber-attacks on the server in a cost-effective manner, in a strategic manner, without additional hardware.

Figure 5:
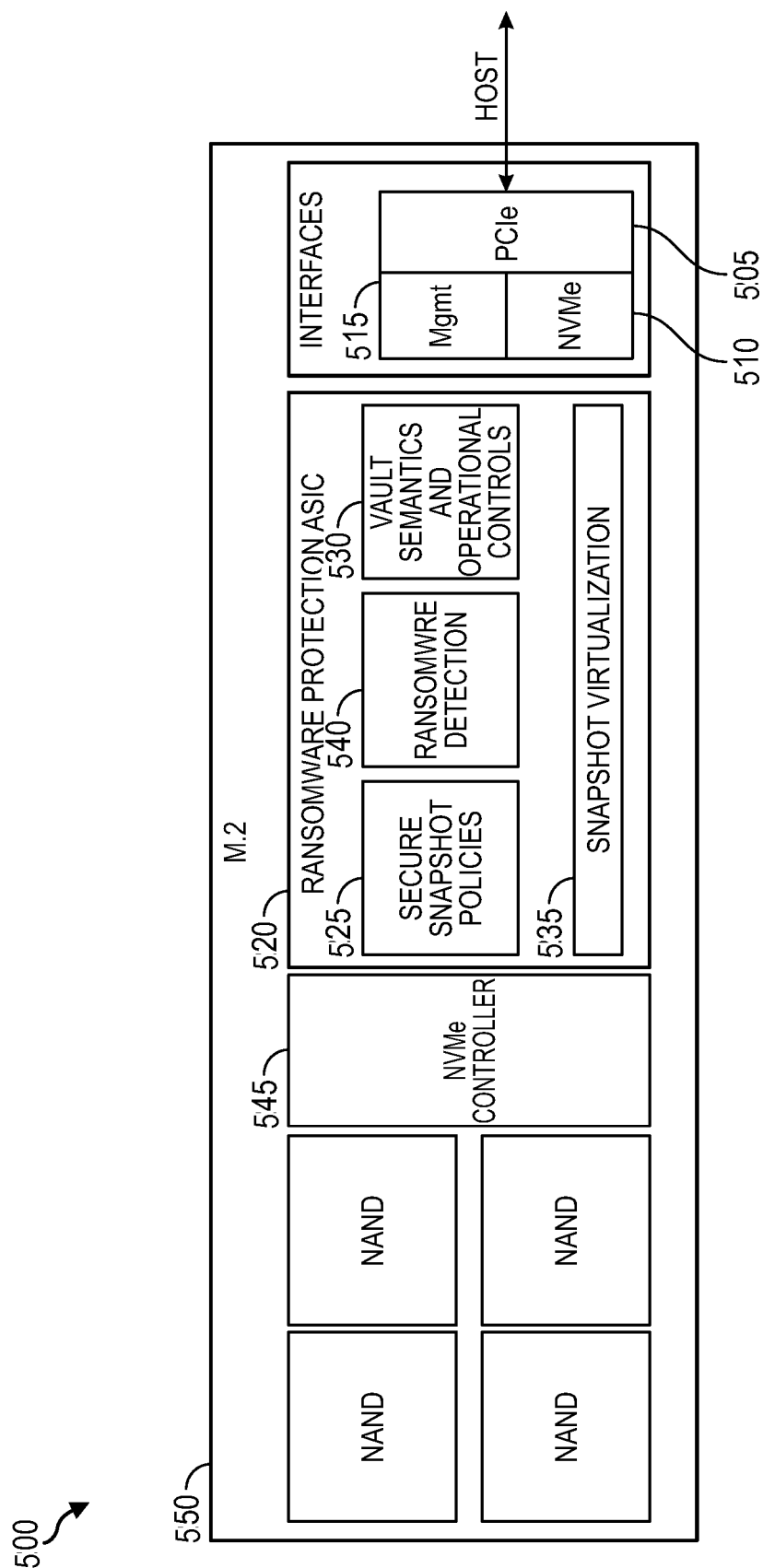
FIG. 5 is a block diagram illustrating an example ransomware protection storage device, which may be employed in the present (instantaneous) pave and/or repave systems and methods using ransomware protection SmartNIC or storage device secure snapshots, according to some embodiments.
Figure 6:
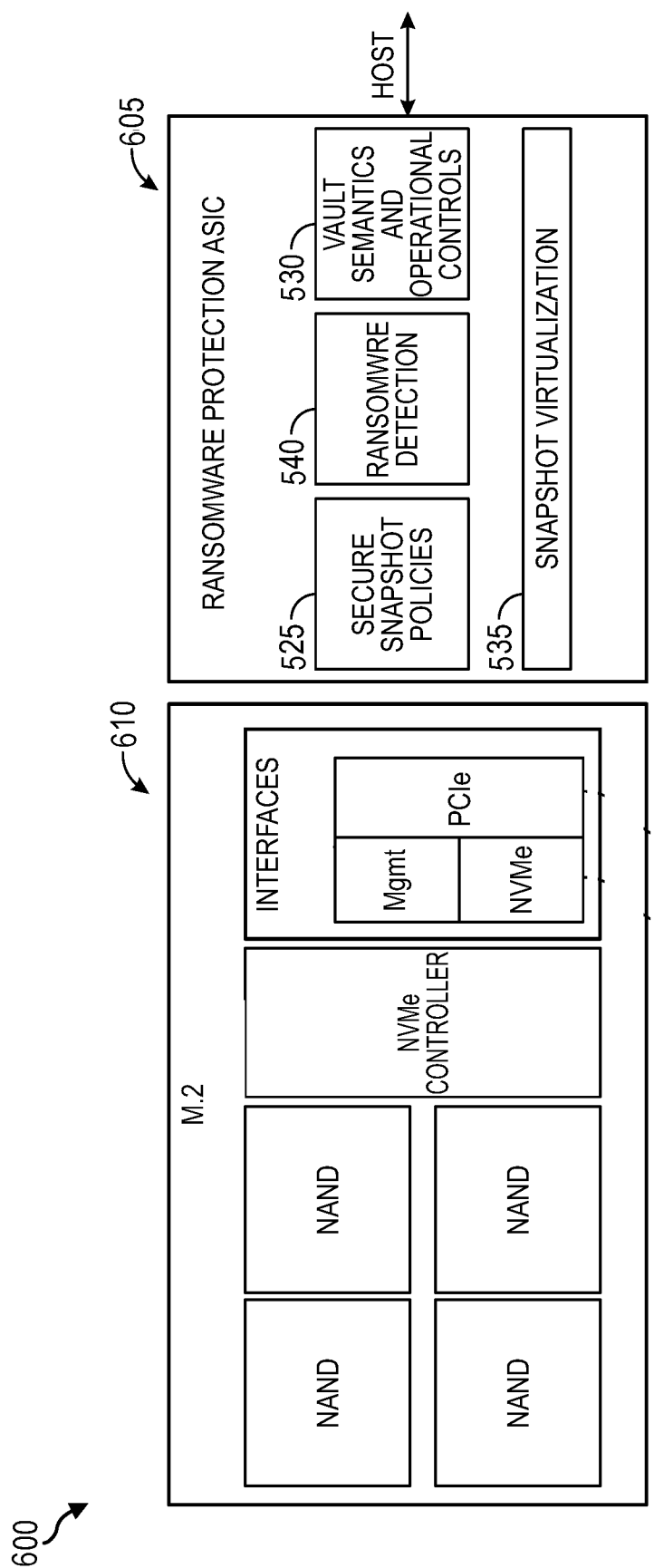
FIG. 6 is a block diagram illustrating another example implementation providing ransomware protection using a ransomware protection Application Specific Integrated Circuit (ASIC) with a storage device, according to some embodiments.
Figure 7:
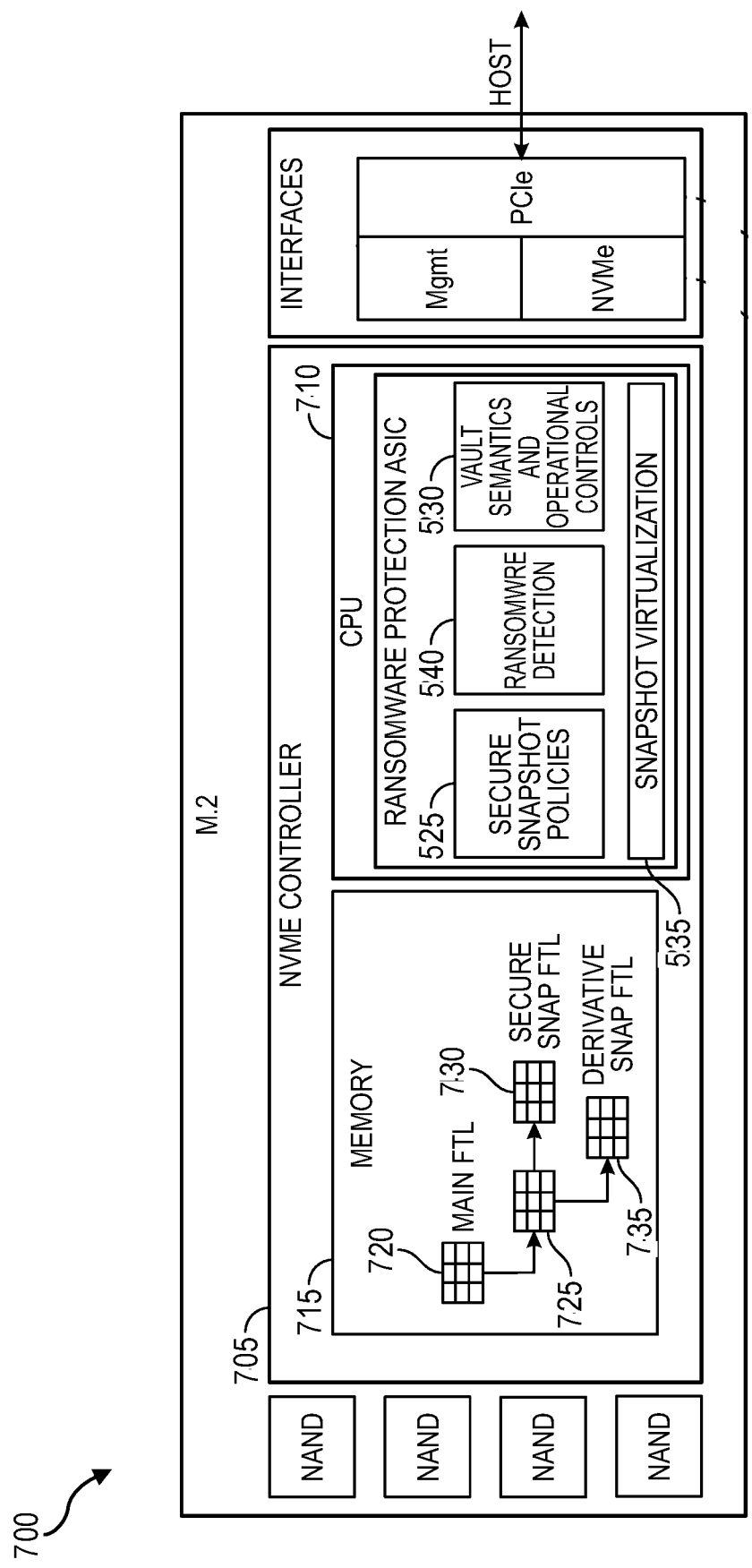
FIG. 7 is a block diagram illustrating a further example implementation providing ransomware protection using ransomware protection computational storage, according to some embodiments.

End-point devices, and the like, including but not limited to laptops and IoT devices, are suspectable to ransomware attacks. There are many types of ransomware attacks. Some focus on encrypting data and others on encrypting a boot device by either encrypting the entire device, critical portions of the device such as the master boot record, or the or the UEFI boot partition. FIG. 5 is a block diagram illustrating example ransomware protection storage device 500, which may be employed in the present (instantaneous) pave and/or repave systems and methods using ransomware protection storage device secure snapshots, according to some embodiments. FIG. 6 is a block diagram illustrating other example implementation 600 for providing (instantaneous) pave and/or repave operations using ransomware protection storage device secure snapshots, such as through use of separate ransomware protection Application Specific Integrated Circuit (ASIC) 605 with storage device 610, according to some embodiments. FIG. 7 is a block diagram illustrating further example implementation 700 for providing (instantaneous) pave and/or repave operations using ransomware protection storage device secure snapshots via ransomware protection computational storage, according to some embodiments. Each of these implementations of embodiments of the present systems and methods include common functionality for ransomware protection, as discussed below. For example, some embodiments (e.g., 500 and 700) of the present systems and methods build ransomware protection into a space constrained storage device, such as, way of example, for illustrative purposes, an M.2 SSD. However, embodiments of the present systems and methods are not limited to any particular form factor, and embodiments of the present systems and methods may be implemented in, and/or with respect to other storage form factors, such as Serial AT Attachment (SATA), E1.S, Ball Grid Array (BGA), etc. However, the term "M.2" or "storage device" may be used throughout this disclosure to indicate any such (space constrained) flash memory storage device, or the like. Further, embodiments of the present systems and methods may be used with respect to or in (physical hard disk drives or the like, as well.

Many end-point devices such as laptops, IoT gateways, IoT devices, and the like, use M.2 as their boot device and primary storage. As noted, as used herein, a "secure snapshot" is a data snapshot that cannot be deleted until a retention timer expires. Embodiments of the present systems and methods use secure snapshots to implement IHS pave and/or repave operations. Implementing secure snapshot and secure snapshot policies, in accordance with embodiments of the present systems and methods, in the M.2 provides a convenient tool to service a wide range of end-point devices. Thus, rather than using a SmartNIC or (other) DPU to protect data and/or boot of the IHS, this mechanism implements the pave and/or repave operations in an M.2, or the like, and thereby streamlines deployment of ransomware protection, particularly in end-point devices, which are typically tight on space and cost sensitive. Embodiments of the present systems and methods, such as through implementing the present systems and methods in an M.2, provide many benefits, such as detailed below.

By implementing the preset systems and methods in an M.2, or the like, the pave and/or repave operations are provided in a centralized fashion. An M.2, or the like, provides a convenient central point to apply pave and/or repave techniques, as all data being stored and retrieved by the IHS that employs an M.2, or the like, is from that an M.2, or the like. Additionally, embodiments of the present systems and methods are OS and virtualization agnostic. That is, since an M.2, or the like, provides storage in the IHS (end-point device) through the IHS buses, such as PCIe, SATA, or the like, as discussed above, OSs or virtualization platforms installed on the IHS (end-point device) discover storage devices through well-established standard storage protocols. In various embodiments of the present systems and methods, a (small)OS-specific driver, or the like, and (a) software module(s), or the like, may be employed as a management interface, as discussed in greater detail below. Also, embodiments of the present systems and methods separate the security domain and the IHS's credentials. Thus, under embodiments of the present systems and methods, since the M.2, or the like, is a separate compute complex and has separate management credentials, an attacker that has gained access to the IHS (end-point device) will not be able to alter the integrity of the M.2 ransomware protection and recovery functions, or the like. Embodiments of the present systems and methods secure storage devices that are ever-increasing in size. With advances in flash technologies, the amount of data stored within the M.2 form factor, or the like, is growing at a rapid pace, which provides a similarly increasing value to a ransomware attacker, or the like.

As noted, FIG. 5 is a block diagram illustrating example ransomware protection storage device 500, specifically a ransomware protection M.2, which may be employed in the present systems and methods for pave and/or repave operations using ransomware protection storage device secure snapshots, according to some embodiments. An M.2 is typically an NVMe device connected to an IHS PCIe bus, such as via PCIe interface 505, or a SATA device connected to a SATA controller. In the block diagram of FIG. 5, an NVMe device is shown as an example. From a logic standpoint, there are two interfaces, data path 510, and management interface path 515, for management commands. Data path 510 may, in accordance with embodiments of the present systems and methods, operate under standard NVMe protocols. Management path 515 may be employed in accordance with embodiments of the present systems and methods, and can be in-band, via PCIe using NVMe Management Interface (NVMe-MI) protocols, or out-of-band such as via 120. In accordance with embodiments of the present systems and methods, management commands may require authentication to separate the management domain from the end-point device operating system.

In the M.2 form factor, or the like, there are often limitations on space, and thermal and cost considerations. For a compact deployment footprint, embodiments of the ransomware protection logic for the present systems and methods may be implemented as Ransomware Protection ASIC (RPA) 520, such as, as a ransomware protection engine. Ransomware protection ASIC 520 includes and implements secure snapshot policies 525, vault semantics and operational controls 530, snapshot virtualization 535, and, in some embodiments, ransomware detection engine 540 (depending on cost and/or space considerations). Ransomware protection ASIC 520 can be implemented as part of NVMe controller 545 for NAND memory 550 (such as discussed below, with respect to FIG. 7) or as a separate ASIC with embedded processor, such as an ARM® processor, or the like, and memory sub-system, such as in FIGS. 5 and 6.

Secure snapshot policy engine 525 implements secure snapshots, which are each a point in time image of a storage object. This secure snapshot cannot be deleted until a retention timer has expired. In embodiments of the present systems and methods, one purpose of a secure snapshot is to ensure that this data can be restored in case it is encrypted or destroyed by a cyber-attack. While the snapshot feature is provided by storage virtualization 535, the policies of when the secure snapshots are taken are hosted in secure snapshot policy engine module 525.

Vault semantics and operational controls 530 ensure that data is locked and isolated from access by an air gap, or the like. Updates to the vault are only allowed at specific scheduled time slots. In the context of using the present ransomware protection storage device to protect, pave or repave end-point devices (end-point IHSs), these vault operational controls can be applied to the data in the secured domain, as management functions for secure snapshots to implement aspects of the present systems and methods. These operational controls include, but are not limited to, fine grain access control, defining a security officer role, time-based or interface-based management command restrictions, etc.

Snapshot virtualization 535 performs mapping, such as at high-speed, by way of example using a state machine. As noted, a snapshot of a device is the data in a point in time when the snapshot is taken. Conceptually, there is a mapping layer that represents the logical blocks to physical blocks mapping. As an example, in the case of a new write to the device after a snapshot is taken, the write is written to a new location and the mapping is updated to point at the new data. The snapshot mapping remains pointing at the old data to reflect on point in time the snapshot was taken. In accordance with embodiments of the present systems and methods, secure snapshot is implemented as a policy on top of this snapshot feature.

As noted, in some embodiments, ransomware detection 540 may be implemented (in ransomware protection ASIC 500), if cost and space permits. The ransomware detection engine will examine data inline or use snapshots delta to detect ransomware attacks, in a near-line manner.

As noted, FIG. 6 is a block diagram illustrating alternate example implementation 600 for providing pave and/or repave operations using ransomware protection storage device secure snapshots, such as through use of separate ransomware protection ASIC 605 with storage device 610, according to some embodiments. This alternate approach to integrating ASIC into M.2, or the like, enables deployment of embodiments of the present systems and methods in any environments utilizing M.2, or the like. In alternative implementation 600 separate ransomware protection ASIC 605 is "built-into" (i.e., incorporated as a component of) the IHS and "commodity" (i.e., "off the shelf") M.2 610 is used by the IHS. As noted above, implementation 600 of embodiments of the present systems and methods includes functionality for pave and/or repave operations using secure snapshots in common with ransomware protection M.2 500 of FIG. 5, specifically ransomware protection ASIC 605, like ransomware protection ASIC 520, includes and implements secure snapshot policies 525, vault semantics and operational controls 530, snapshot virtualization 535, and, in some embodiments, ransomware detection engine 540 (depending on cost and/or space considerations).

As noted, FIG. 7 is a block diagram illustrating further alternate example implementation in NVMe M.2 700 for providing pave and/or repave operations using ransomware protection storage device secure snapshots via ransomware protection computational storage, according to some embodiments. Therein, ransomware protection and pave and/or repave operations using ransomware protection storage device secure snapshots are implemented as a part of NVMe controller 705, such as, as ransomware protection logic, which may define a ransomware protection engine, or the like. The ransomware protection logic is implemented as part of NVMe controller 705, in a computational storage approach. In such an implementation, the ransomware protection logic, including the secure snapshot policies 525, vault semantics and operational controls 530, snapshot virtualization 535, and, in some embodiments, ransomware detection engine 540 (depending on cost and/or space considerations), run on the integrated CPU complex 710, such as a set of ARM® processor cores, or the like in the controller 705, working on local memory 715 to implement snapshot mapping using the Flash Transition Layer (FTL). Some embodiments of the present systems and methods may be implemented in an existing NVMe controller with sufficient processing power. In the illustrated example, main FTL 720 represents the set of blocks of memory 715. The secure snapshot data blocks are representation by secure snapshot mapping 725, a copy of main FTL 720 at the point in time the secure snapshot is taken, providing secure snapshot FTL 730. Derivative read/writable snapshots (such as discussed below with respect to boot protection) are, likewise, represented by derivative snapshot FTL 735, on the same basis as secure snapshot FTL 730.

In many cases, the M.2, or the like, is the only storage device in an IHS (end-point device). While it may be advantageous to, such as in accordance with embodiments of the present systems and methods, to revert a boot device to a last known state, such as discussed below with respect to FIGS. 8 through 10, the application data on the M.2, or the like, is typically updated much more frequently. Thus, (some) embodiments of the present systems and methods create the boot device separate from the application data. In this way, the boot device, which is updated infrequently, can be reverted, as described below with respect to FIGS. 8 through 10, separately from the data. For instance, in an NVMe M.2, a small namespace is created for boot, and (a) separate namespace(s) is (are) created for data. The data namespace(s) may have a separate secure snapshot schedule and policy.

Thusly, creation of the secure snapshot may include creating, by snapshot virtualization logic 535, in the storage device ransomware protection logic, a secure snapshot identifier and a mapping for the secure snapshot, preserving a view of the data object as of the point in time the secure snapshot is taken. Hence, in accordance with secure snapshot operations under embodiments of the present systems and methods, a secure snapshot is created, such as by the snapshot virtualization logic (535) in the ransomware protection ASIC (520). A snapshot identifier and a mapping are created. The mapping is used to preserve the view of the data as of the point in time the snapshot is taken. A secure snapshot is created with a retention time and the snapshot can only be deleted by command or automatically by policy after the retention time expires.

Further, secure snapshot access may be implemented by creating the secure snapshot as an object in the storage device ransomware protection logic and mapping the secure snapshot to a storage device namespace, as a target device for discovery by the information handling system. For example, to facilitate secure snapshot access, a secure snapshot is created as an object in the ransomware protection ASIC (520), and for read/write access, it is mapped to an NVMe namespace and in turn mapping as a target device for discovery by the host. Data blocks of the original device and the snapshots are stored on the space managed by the NVMe controller. This can be done as a linear stop space where the NVMe namespaces are managed by the ransomware protection ASIC (520). Or additional namespaces can be used behind the NVMe controller depending on the detailed implementation of the mapping layer. In accordance with embodiments of the present systems and methods, Secure snapshots are read-only by default, this protects the data. In accordance with embodiments of the present systems and methods, for convenience and/or for application use, a read/writable snapshot can be created on top of the secure snapshot, as a "derivative" (secure) snapshot. In this way, the device representing the read/writable snapshot can function as a normal device. On a reboot, if necessary, the read/writeable snapshot can be deleted and recreated to restore the data to the secure snapshot state.

A delete operation of a secure snapshot might not be allowed, except after the aforementioned retention timer expires. However, if such a delete operation is desired, robust safeguards are placed by embodiments of the present systems and methods. For example, multi-party authentication and authorization where two separate roles such as admin role and security officer role from the operator and one service role from a vendor to consent in an auditable event may be employed, before a secure snapshot can be deleted.

Typically, a storage device such as an M.2 does not have a network interface. Thus, in accordance with embodiments of the present systems and methods, a host OS driver and software package may be used in embodiments of the present systems and methods to manage the secure snapshot(s) and restore functions. As an example, on a Windows® laptop, snapshot creation and restore may be managed by the Windows native Volume Shadow Copy Service (VSS). Such embodiments may include an embodiment of a VSS provider to leverage this feature. In addition, a (thin) driver may interface with the storage device (M.2) secure snapshot management interface.

Applications may employ more than one storage device. For example, multiple name spaces may be used on a same storage device (e.g., multiple NVMe namespaces on the same M.2) or multiple storage devices (e.g., multiple M.2s). For application-consistent secure snapshots, a host agent, such as Windows VSS employed in accordance with embodiments of the present systems and methods may instruct the applications to quiesce to a clean state for quick recovery and/or pave and/or repave operations using ransomware protection storage device secure snapshots in accordance with embodiments of the present systems and methods. For example, in accordance therewith, an application may complete any transactions in progress and then stop further writes. The host agent (e.g., Windows VSS) then instructs the devices to take the snapshots as described above. Since the writes are stopped until all the devices complete the snapshots, the resulting set of snapshots across the devices are consistent with respect to application recovery.

Embodiments of the present systems and methods enable pave and repave operations, in accordance with embodiments of the present systems and methods, in end-point device operating environment using a ransomware protection storage device, such as a ransomware protection M.2, that has a separate security domain from the end-point device. Embodiments of the present systems and methods provide users an extra layer of protection and fast recovery from ransomware attacks that involves the boot device and/or the data. This enables a robust defense strategy for the end-point device to return to full operating capacity with a mere reboot, even in the presence of a cyber-attack. Additionally, this protection may be provided in an "out of band" manner, such that an application on the end-point device, or even the end-point device itself, is unaware, and under normal operation, unaffected by the protection.

Embodiments of the present systems and methods for (instantaneous) pave and/or repave using ransomware protection SmartNIC or storage device secure snapshots implement pave and/or repave using a secure snapshot of the known good image of the boot and operating environment and always boot from the read/writeable snapshot of the secure snapshot. For pave, the IHS is initialized with the desired revision of the firmware and software. The IHS boots from read/writeable snapshot created from the secure snapshot. For repave, the read/writable snapshot is deleted and recreated from the secure snapshot.

Figure 8:
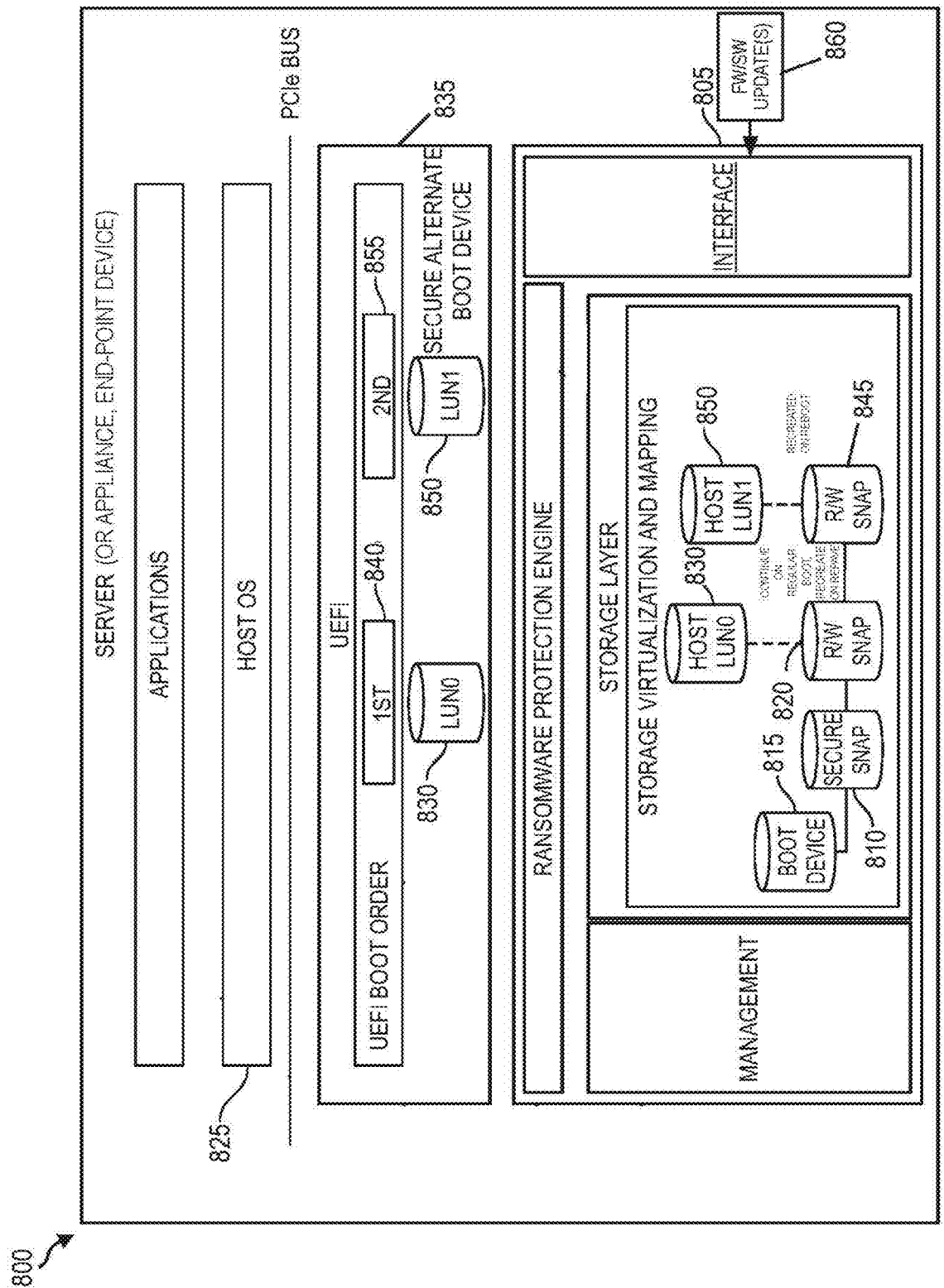
FIG. 8 is a block diagram illustrating an example of (instantaneous) pave and/or repave using ransomware protection SmartNIC secure snapshots, according to some embodiments.
Figure 9:
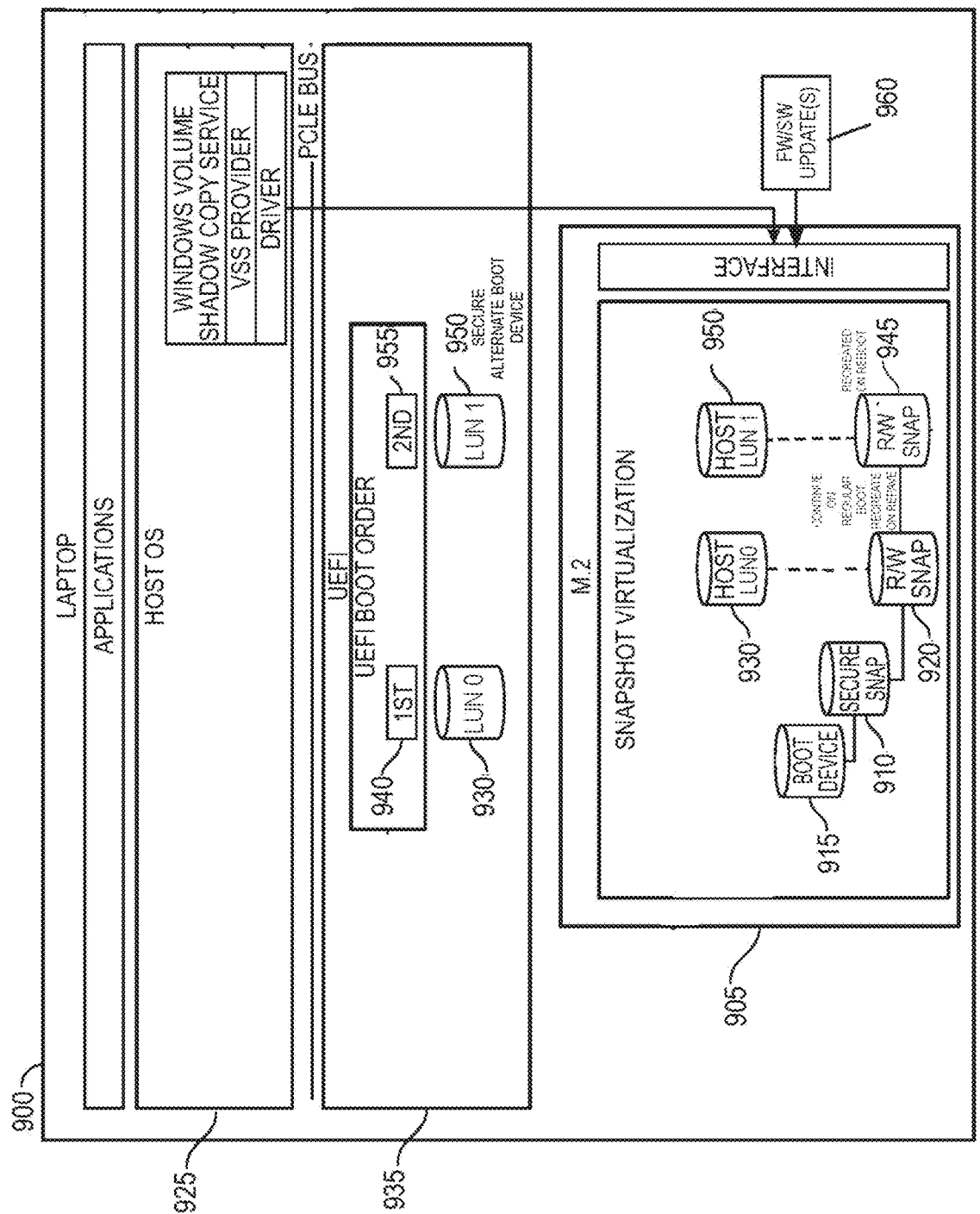
FIG. 9 is a block diagram illustrating an example of (instantaneous) pave and/or repave using ransomware protection storage device secure snapshots, according to some embodiments.

FIG. 8 is a block diagram illustrating an example of (instantaneous) pave and/or repave 800 using ransomware protection SmartNIC 805 secure snapshots 810, according to some embodiments. FIG. 9 is a block diagram illustrating an example of (instantaneous) pave and/or repave 900 using ransomware protection storage device (M.2) 905 secure snapshots 910, according to some embodiments. FIGS. 8 and 9 show abridged version of ransomware protection SmartNIC 300 of FIG. 4 and ransomware protection storage devices 500, 600 or 700 of FIGS. 5 through 7, respectively, illustrating (only) the elements of the ransomware protection (engine) employed, in accordance with embodiments of the present systems and methods, such as, in example process 1000 of FIG. 10 for providing pave and/or repave operations using ransomware protection storage device secure snapshots.

With respect to pave, or initialization, a pave operation refers to the initialization of the server, appliance, or end-point device (i.e., the IHS) to a known good state. The IHS system image is established on boot device 815/915. Secure snapshot 810/910 is created, and a read and writable snapshot 820/920 is created from secure snapshot 810/910 and exposed to host 825/925, as LUN0 830/930, through UEFI (BIOS) 835/935 as primary boot device 840/940.

With respect to "day-to-day" operations, because snapshot 820/920 is read/writable, the host can operate normally. Modifications can be made to boot device 815/915, as necessary. Read/writable snapshot 820/920 persists across reboots. The resulting behavior is the same as a regular storage device.

With respect to automatic recovery from attacks, to provide boot protection from ransomware attacks, second read and writable snapshot 845/945 is created from secure snapshot 810/910. Read and writable snapshot 845/945 has a different characteristic where it is recreated on each reboot. This snapshot is exposed to host 825/925, as LUN1 850/950, through UEFI (BIOS) 835/935 as alternate (e.g., second) boot device 855/955. The resulting behavior is that secure alternate boot device 850/950 is always in a known good state after a reboot, and therefore, serves as a safe fallback in the case the primary boot device is compromised by ransomware attacks or other issues such as operator or configuration errors. Since second read and writable snapshot 845/945 is created from secure snapshot 810/910, alternate boot device alternate boot device 855/955 can also be safe, since it is not affected by ransomware attacks on read and writable snapshot 820/920.

With respect to repave (i.e., reinitialization), to perform a repave, primary boot read and writable snapshot 820/920 is recreated on a subsequent reboot. This may be accomplished by sending a repave command through a management interface (420/515). The end result, in accordance with embodiments of the present systems and methods, is that primary boot device 830/930 is restored to a known good state captured by (subsequent) secure snapshot 810/910.

With respect to the secure domain and credentials, management operations of the SmartNIC or M.2 is protected by a secure domain with a separate set of credentials and/or policies from the host. These management operations include the secure snapshot(s), read and writable snapshot(s), pave, repave, and policies commands. In the case of SmartNIC (400), management operations can be optionally limited to an external management interface (420/515).

With respect to updating the operating environment, when the boot and/or the operating environment of an IHS needs to be updated, the workflow is similar to the pave or initialization process described above. A firmware and/or software package 860/960 is sent to the SmartNIC (400) or M.2 implementation (500/600/700). The package is validated using cryptographic keys to ensure authenticity, such as by an embedded check in the software that is currently running on the SmartNIC or ransomware protection device, as part of download of the update package 860/960. For example, a checksum may be checked for validity of package 8602/960, an encrypted key may be checked for authenticity, and/or the like. Once validated, the image is installed on the boot device (815/915). A new secure snapshot and corresponding read and writable snapshots (820/920 and 845/945) are created for primary and alternate boot devices (830/930 and 850/950). As a result, a reboot will pivot the host IHS to a new (updated) known good state. The previous secure snapshot may be retained, in accordance with embodiments of the present systems and methods, for revert purposes.

Figure 10:
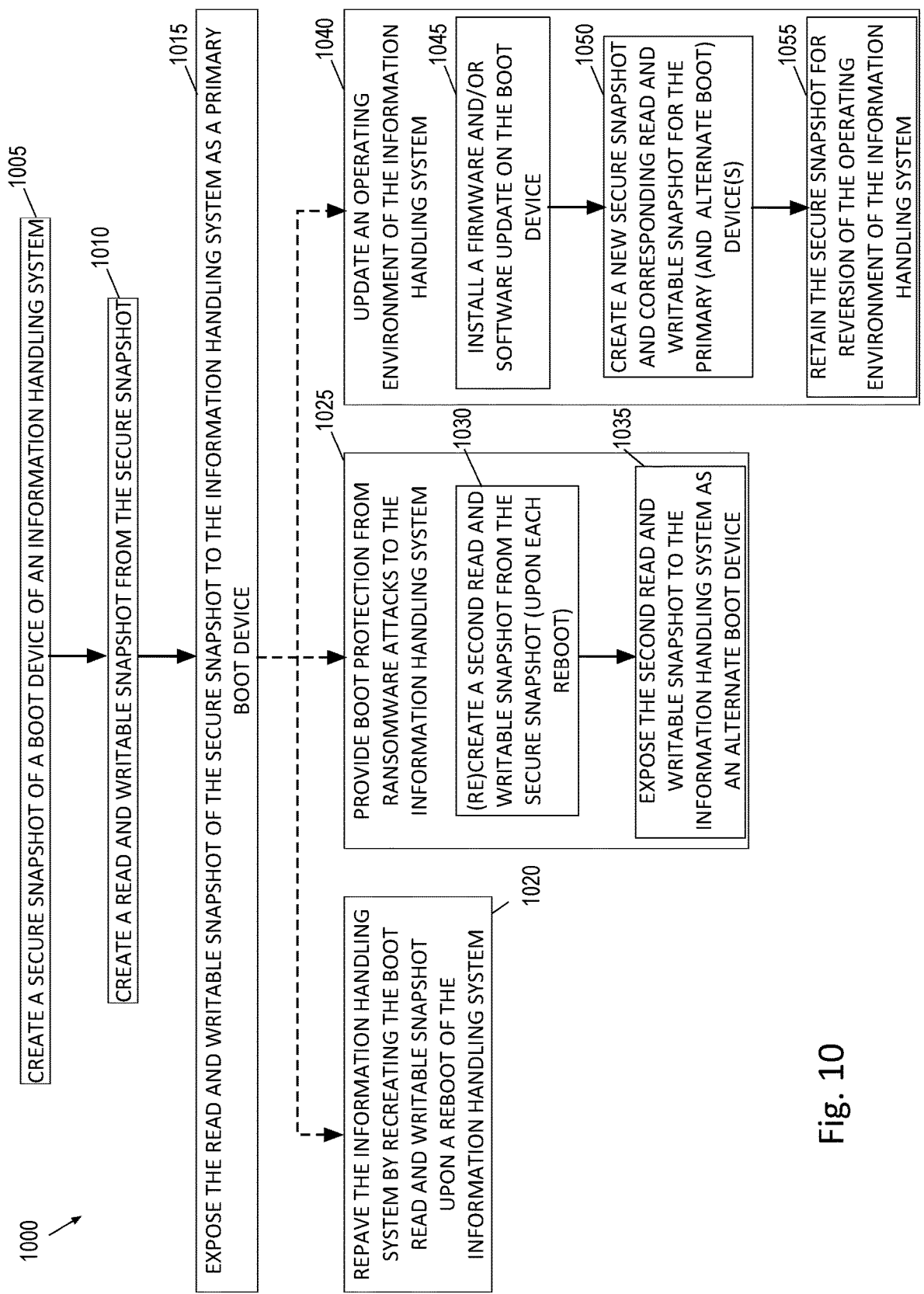
FIG. 10 is a flowchart of an example process for (instantaneous) pave and/or repave systems and methods using ransomware protection SmartNIC or storage device secure snapshots, according to some embodiments.

FIG. 10 is a flowchart of example process 1000 for (instantaneous) pave and/or repave using ransomware protection SmartNIC (400) or storage device implementation (500/600/700) secure snapshots, according to some embodiments. Therein, an IHS may be paved through creation of a secure snapshot of a boot device of the IHS at 1005. At 1010, a read and writable snapshot from the secure snapshot is created. At 1015 the read and writable snapshot of the secure snapshot is exposed to the IHS, through the UEFI (BIOS) of the IHS, as a primary boot device. In accordance with embodiments of the present systems and methods, the read and writable snapshot created at 1010 persists across reboots of the IHS, thereby, retaining modifications made to the boot device.

At 1020, the IHS may be repaved by recreating the boot read and writable snapshot upon a reboot of the IHS, such as in response to receipt of a repave command, thereby, restoring the primary boot device to a known good state captured by the secure snapshot.

Boot protection from ransomware attacks may be provided, at 1025, by, at 1030, creating a second read and writable snapshot from the secure snapshot (created at 1005) and recreating the second read and writable snapshot from the secure snapshot on each reboot of the IHS, and at 1035 exposing the second read and writable snapshot to the IHS, through the UEFI (BIOS) of the IHS, as an alternate boot device.

At 1040 an operating environment of the IHS may be updated, by installing a received firmware and/or software update on the boot device, at 1045, creating a new secure snapshot and corresponding read and writable snapshot for the primary and alternate boot devices, at 1050, and, optionally, at 1055, retaining the secure snapshot for reversion of the operating environment of the IHS.

Advantageously, in accordance with the forgoing, the repave is generally (instantaneous), such as by just recreating the read/writable snapshot during reboot. No lengthy image transfers are necessary as with PXE or USB drive implemented pave and/or repave operations. Further, the risk of errors is minimized. Additionally, embodiments of the present repave systems and methods using ransomware protection SmartNIC or storage device secure snapshots are operating system and virtualization agnostic. That is, since the SmartNIC and/or M.2 provides storage to servers, appliances, and end-point devices through buses such as PCIe or SATA, operating systems or virtualization platforms installed on these end-point devices discover storage devices through well-established standard storage protocols. The SmartNIC or M.2 is a separate compute complex and has separate management credentials from the IHS being paved or repaved. Thus, an attacker that has gained access to the operating environment of the IHS will not be able to alter the integrity of the ransomware protection functions, such as the snapshots used in the present pave and/or repave operations. Also, the pave and/or repave operations hereunder are secured by this security domain and credential, as well.

As noted, pave and repave are being called for by enterprises, such as major banks. Existing available methods are through customers' PXE environments, which may or may not be secure, or through professional services to install using USB-medias, which is time consuming, costly, and potentially risks errors. Additionally, for an equipment vendor, or the like, to implement pave/initialization and repave/reinitialization at a customer site using customer PXE is generally analogous to moving manufacturing to customer sites. This approach has a high cost in product development and potentially a high service cost when this type of secondary manufacturing approach encounters unexpected issues. Embodiments of the present systems and methods provide pave and/or repave solutions for IHSs that employ a SmartNIC or M.2, the latter of which has generally become ubiquitous. In addition to the benefits or the feature to a customer, it also provides great values in reducing product development costs and risks to a vendor.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

In various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules and/or engines implemented in software for execution by various types of processors may, for instance, include one or more physical or logical blocks of computer instructions, which may, for instance, be organized as an object or procedure. Nevertheless, the executables of an identified module and/or engine need not be physically located together but may include disparate instructions stored in different locations which, when joined logically together, include the module and/or engine and achieve the stated purpose for the module and/or engine. Indeed, a module and/or engine of executable code may be a single instruction, or many instructions, and may even be distributed over several different code segments, among different programs, and across several memory devices. Similarly, operational data may be identified and illustrated herein within modules and/or engines and may be embodied in any suitable form and organized within any suitable type of data structure. The operational data may be collected as a single data set or may be distributed over different locations including over different storage devices.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for paving an information handling system comprising:
   creating, via a storage smart network interface controller (SmartNIC), a secure snapshot of a boot device of the information handling system, wherein the secure snapshot is created out-of-band from the information handling system;
   creating, via the SmartNIC, a read and writable snapshot from the secure snapshot, wherein creating the secure snapshot and creating the read and writable snapshot are protected by credentials separate from credentials of the information handling system;
   detecting, via the SmartNIC, a ransomware attack; and
   exposing, via the SmartNIC, the read and writable snapshot of the secure snapshot to the information handling system, through a unified extensible firmware interface or basic input/output system of the information handling system, as a primary boot device, thereby providing the information handling system with boot protection from the ransomware attack detected by the SmartNIC.

2. The method of claim 1, further comprising repaving the information handling system comprising recreating the read and writable snapshot upon a reboot of the information handling system, in response to receipt of a repave command, restoring the primary boot device to a known good state captured by the secure snapshot.

3. The method of claim 1, wherein modifications to the read and writable snapshot persist across reboots of the information handling system.

4. The method of claim 1, further comprising providing the information handling system with boot protection from a further ransomware attack, comprising:
creating a second read and writable snapshot from the secure snapshot;
recreating the second read and writable snapshot from the secure snapshot on each reboot of the information handling system; and
exposing the second read and writable snapshot to the information handling system, through the unified extensible firmware interface or basic input/output system of the information handling system, as an alternate boot device.

5. The method of claim 4, further comprising, updating an operating environment of the information handling system comprising:
receiving a firmware and/or software update package;
installing the firmware and/or software update package on the boot device;
creating a new secure snapshot and corresponding read and writable snapshot for the primary boot device and the alternate boot device; and
retaining the secure snapshot for reversion of the operating environment of the information handling system.

6. A smart network interface controller comprising:
a processor;
a memory;
a ransomware protection device configured to pave an information handling system by:
creating a secure snapshot of a boot device of the information handling system, wherein the secure snapshot is created out-of-band from the information handling system;
creating a read and writable snapshot from the secure snapshot, wherein creating the secure snapshot and creating the read and writable snapshot are protected by credentials separate from credentials of the information handling system;
detecting a ransomware attack; and
exposing the read and writable snapshot of the secure snapshot to the information handling system, through a unified extensible firmware interface or basic input/output system of the information handling system, as a primary boot device, thereby providing the information handling system with boot protection from the ransomware attack detected by the ransomware protection device of the smart network interface controller.

7. The smart network interface controller of claim 6, wherein the ransomware protection device is further configured to repave the information handling system by recreating the read and writable snapshot upon a reboot of the information handling system, in response to receipt of a repave command through a management interface of the smart network interface controller, restoring the primary boot device to a known good state captured by the secure snapshot.

8. The smart network interface controller of claim 6, wherein modifications to the read and writable snapshot persist across reboots of the information handling system, retaining modifications made to the boot device.

9. The smart network interface controller of claim 6, wherein the ransomware protection device is further configured to provide the information handling system boot protection from a further ransomware attack, by:
creating a second read and writable snapshot from the secure snapshot;
recreating the second read and writable snapshot from the secure snapshot on each reboot of the information handling system; and
exposing the second read and writable snapshot to the information handling system, through the unified extensible firmware interface or basic input/output system of the information handling system, as an alternate boot device.

10. The smart network interface controller of claim 9, wherein the ransomware protection device is further configured to update an operating environment of the information handling system by:
receiving a firmware and/or software update package;
installing the firmware and/or software update package on the boot device; and
creating a new secure snapshot and corresponding read and writable snapshot for the primary boot device and the alternate boot device.

11. The smart network interface controller of claim 10, wherein the ransomware protection device is further configured to retain the secure snapshot for reversion of the operating environment of the information handling system.

12. A storage device comprising:
memory;
a ransomware protection device configured to pave an information handling system by:
creating a secure snapshot of a boot device of the information handling system, wherein the secure snapshot is created out-of-band from the information handling system;
creating a read and writable snapshot from the secure snapshot, wherein creating the secure snapshot and creating the read and writable snapshot are protected by credentials separate from credentials of the information handling system, and wherein writes to the boot device are stopped until creating the secure snapshot and creating the read and writable snapshot are completed;
detecting a ransomware attack; and
exposing the read and writable snapshot of the secure snapshot to the information handling system, through a unified extensible firmware interface or basic input/output system of the information handling system, as a primary boot device, thereby providing the information handling system with boot protection from the ransomware attack detected by the ransomware protection device of the storage device.

13. The storage device of claim 12, wherein the storage device further comprises an application specific integrated circuit comprising the ransomware protection device.

14. The storage device of claim 12, wherein the information handling system further comprises an application specific integrated circuit comprising the ransomware protection device, the application specific integrated circuit coupled to the storage device.

15. The storage device of claim 12, wherein the storage device further comprises a memory controller comprising the ransomware protection device, and wherein the memory controller is associated with the memory.

16. The storage device of claim 12, wherein the ransomware protection device is further configured to repave the information handling system by recreating the read and writable snapshot upon a reboot of the information handling system, in response to receipt of a repave command by the storage device, restoring the primary boot device to a known good state captured by the secure snapshot.

17. The storage device of claim 12, wherein modifications to the read and writable snapshot persist across reboots of the information handling system, retaining modifications made to the boot device.

18. The storage device of claim 12, wherein the ransomware protection device is further configured to provide the information handling system boot protection from ransomware attacks, by:
   creating a second read and writable snapshot from the secure snapshot;
   recreating the second read and writable snapshot from the secure snapshot on each reboot of the information handling system; and
   exposing the second read and writable snapshot to the information handling system, through the unified extensible firmware interface or basic input/output system of the information handling system, as an alternate boot device.

19. The storage device of claim 18, wherein the ransomware protection device is further configured to update an operating environment of the information handling system by:
   receiving a firmware and/or software update package;
   installing the firmware and/or software update package on the boot device; and
   creating a new secure snapshot and corresponding read and writable snapshot for the primary boot device and the alternate boot device.

20. The storage device of claim 19, wherein the ransomware protection device is further configured to retain the secure snapshot for reversion of the operating environment of the information handling system.

* * * * *